United States Patent
Takeuchi et al.

(10) Patent No.: US 7,811,469 B2
(45) Date of Patent: Oct. 12, 2010

(54) VERTICAL ALIGNMENT FILM AND VA MODE LIQUID CRYSTAL CELL

(75) Inventors: Hiroshi Takeuchi, Kanagawa (JP); Mitsuyoshi Ichihashi, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 12/426,506

(22) Filed: Apr. 20, 2009

(65) Prior Publication Data

US 2009/0268143 A1  Oct. 29, 2009

(30) Foreign Application Priority Data

Apr. 24, 2008  (JP)  ............... 2008-113871

(51) Int. Cl.
 C09K 19/00  (2006.01)
 C09K 19/06  (2006.01)
 C09K 19/52  (2006.01)
 G02F 1/03  (2006.01)
 G02F 1/13  (2006.01)

(52) U.S. Cl. .............. 252/299.01; 252/299.1; 252/299.6; 252/299.61; 252/299.62; 252/299.63; 252/299.64; 252/299.65; 252/299.66; 430/20; 428/1.1; 428/1.2; 428/1.3; 349/130; 349/182

(58) Field of Classification Search .......... 252/299.01, 252/299.1, 299.6–6; 428/1.1–1.3; 430/20; 349/130, 182
See application file for complete search history.

(56) References Cited

U.S. PATENT DOCUMENTS

2003/0067579 A1 * 4/2003 Inoue et al. ............... 349/187

FOREIGN PATENT DOCUMENTS

| JP | 2000-122066 A | 4/2000 |
|----|---------------|--------|
| JP | 2007-225791 A | 9/2007 |
| JP | 2007-256378 A | 10/2007 |

* cited by examiner

*Primary Examiner*—Geraldina Visconti
(74) *Attorney, Agent, or Firm*—Buchanan Ingersoll & Rooney PC

(57) ABSTRACT

The present invention provides a vertical alignment film having a polymerizable liquid crystal compound having negative dielectric constant anisotropy, where the polymerizable liquid crystal compound is vertically aligned against the surface of the substrate, and then the polymerizable liquid crystal compound is fixed to form the vertical alignment film.

2 Claims, No Drawings

VERTICAL ALIGNMENT FILM AND VA MODE LIQUID CRYSTAL CELL

BACKGROUND OF THE INVENTION

1. Field of the Invention

The present invention relates to a vertical alignment film and a VA mode liquid crystal cell.

2. Description of the Related Art

In the past, as a process for producing liquid crystal cells, a liquid crystal vacuum injection process has been adopted in which liquid crystals are injected due to the difference in pressure between the inside and outside of the panel. In recent years, however, now that a liquid crystal TV has become large-sized, a problem arises that the liquid crystal vacuum injection is time-consuming in the production.

To reduce the time for producing liquid crystal, a one drop filling (ODF) process has been developed. In the one drop filling process, a liquid crystal is dropped directly on a base panel, and the dropped liquid crystal is evenly distributed over the whole panel by a coalescing pressure of panels, and a liquid crystal layer is formed.

When a VA (vertical alignment) liquid crystal cell is produced according to the ODF process, it is known that the liquid crystal compound can be aligned vertically by disposing a polyimide-based alignment film containing a hydrophobic component such as a long chain alkyl group, a fluorine-substituted alkyl group and an alicyclic skeleton inside the pair of the panels between which the liquid crystal compound is put (see Japanese Patent Application Laid-Open (JP-A) Nos. 2007-256378 and 2007-225791).

However, since a liquid crystal compound is hardly compatible with the hydrophobic components in the alignment film, it has been problematic that the liquid crystal compound is difficult to be wetted and spread over, so that the alignment film is overloaded, and uneven alignment tends to occur.

Meanwhile, there has been developed another technique in which even when the polyimide-based alignment film contains only a small amount of hydrophobic components, a liquid crystal compound is easy to be wet and spread over and is aligned vertically by subjecting rubbing treatment to the polyimide-based alignment film.

However, such rubbing is likely to cause uneven rubbing corresponding to the surface roughness of the base panel; generation of static electricity due to the rubbing; and attachment of fine; and attachment of fine dusts; and thus makes it difficult to sufficiently align the liquid crystal compounds vertically. In a VA mode liquid crystal cell, such insufficient vertical alignment of the liquid crystal compounds often causes a light leakage when displaying black color in the liquid crystal display apparatus using the VA mode liquid crystal cells.

In order to produce a VA mode liquid crystal cell through the ODF method, a technique has been disclosed which utilizes a film on which a polymerizable liquid crystal compound is deposited in a hybrid aligned state as a vertical alignment film (e.g., JP-A No. 2000-122066).

However, even when the technique described in the JP-A-No. 2000-122066 is used, liquid crystal compounds cannot be fully aligned vertically, and the light leakage occurs when a black color is displayed.

Thus, a vertical alignment film still remains unsatisfactory which is capable of vertically aligning liquid crystal compounds sufficiently, without causing light leakage when black is displayed, and capable of being produced in a short time by an ODF process.

BRIEF SUMMARY OF THE INVENTION

The present invention is to solve the conventional problems mentioned above, and to achieve the following purposes. Specifically, the object of the present invention is to provide a vertical alignment film capable of vertically aligning liquid crystal compounds sufficiently, without causing light leakage when black is displayed, and capable of being produced in short time by an ODF process; and a VA mode liquid crystal cell.

The means to solve the problems are as follows.

<1> A vertical alignment film including:

a polymerizable liquid crystal compound having negative dielectric constant anisotropy, wherein the polymerizable liquid crystal compound is vertically aligned against the surface of a substrate, and then the polymerizable liquid crystal compound is fixed to form the vertical alignment film.

<2> The vertical alignment film according to <1>, wherein the polymerizable liquid crystal compound having negative dielectric constant anisotropy is the compound represented by the following General Formula (I):

$$K_1\text{-}L_1\text{-}(Z_1\text{-}A_1)_m\text{-}Z_3\text{-}M\text{-}Z_4\text{-}(A_2\text{-}Z_2)_n\text{-}L_2\text{-}K_2 \quad \text{General Formula (I)}$$

wherein $K_1$ represents a polymerizable group, $L_1$ and $L_2$ are the same or different, and each represent a divalent spacer group, $Z_1$, $Z_2$, $Z_3$ and $Z_4$ are the same or different, and each represents a divalent connecting group, $A_1$ and $A_2$ are the same or different, and each represent a divalent cyclic group, m and n are the same or different, and each represents an integer of 0 to 3, M represents any of the groups represented by the following General Formulas (2) to (7), and $K_2$ is any one of a hydrogen atom, an alkyl group, a substituent group, and a polymerizable group.

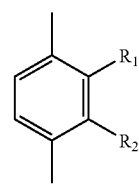

(2)

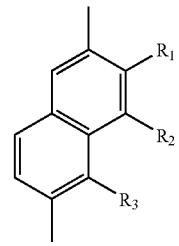

(3)

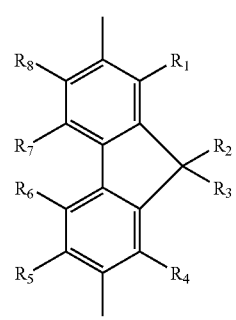

(4)

-continued

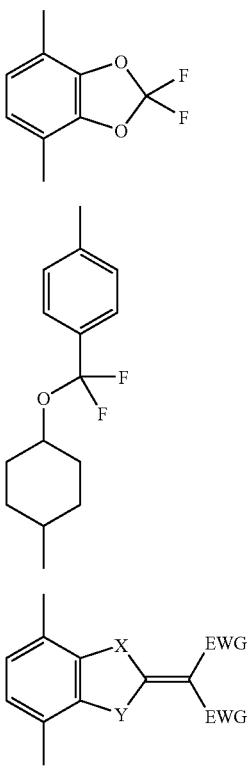

(5)

(6)

(7)

wherein in the General Formulas (2) to (7), $R_1$ to $R_8$ each represent a hydrogen atom, a fluorine atom, $CF_3$ or CN; in the General Formula (2), at least one of $R_1$ and $R_2$ is not a hydrogen atom; in the General Formula (3), at least one of $R_1$ to $R_3$ is not a hydrogen atom; in the General Formula (4), at least one of $R_1$ to $R_8$ is not a hydrogen atom; in the General Formula (7), X and Y each represent any one of oxygen atom, sulfur atom, and $NR_{100}$, the $R_{100}$ representing a hydrogen atom or an alkyl group having 1 to 4 carbon atoms; and EWG represents an electron withdrawing group.

<3> A VA mode liquid crystal cell having the vertical alignment film according to any one of <1> and <2>.

The present invention can provide a vertical alignment film which is capable of vertically aligning liquid crystal compounds sufficiently, without causing light leakage when black is displayed, and capable of being produced in short time by an ODF process; and a VA mode liquid crystal cell.

DETAILED DESCRIPTION OF THE INVENTION (Vertical Alignment Film)

The vertical alignment film of the present invention is composed of the film formed by aligning polymerizable liquid crystal compounds having negative dielectric constant anisotropy to a surface of a substrate, then fixing the polymerizable liquid crystal compounds, and contains other configuration, where appropriate.

The "negative dielectric constant anisotropy" means the dielectric constant in the direction vertical to the long axis of the liquid crystal compound is larger than the dielectric constant in the direction of the long axis. Whether the polymerizable liquid crystal compound has negative dielectric constant anisotropy or not can be determined by the method as described in Ekisho Binran (Handbook of Liquid Crystal) edited by Ekisho Binran Henshu linkai (Editorial Committee of Handbook of Liquid Crystal), pp. 209-210, published by Maruzen Co., Ltd.

<Polymerizable Liquid Crystal Compound Having Negative Dielectric Constant Anisotropy>

The polymerizable liquid crystal compound having negative dielectric constant anisotropy (hereinafter, simply referred to as "polymerizable liquid crystal compound") is not particularly limited and may be selected appropriately depending on the purpose. Preferable is the compound represented by the following General Formula (I).

$$K_1\text{-}L_1\text{-}(Z_1\text{-}A_1)_m\text{-}Z_3\text{-}M\text{-}Z_4\text{-}(A_2\text{-}Z_2)_n\text{-}L_2\text{-}K_2 \quad \text{General Formula (I)}$$

In the General Formula (I), $K_1$ represents a polymerizable group.

The polymerizable group is not particularly limited and may be selected appropriately depending on the purpose. The polymerizable group is preferably a group capable of causing an addition polymerization reaction or a group capable of causing a condensation polymerization reaction, with the group capable of performing an addition polymerization reaction being more preferable.

More specific examples of the group capable of performing an addition polymerization reaction or the group capable of performing a condensation polymerization reaction include a polymerizable ethylenic unsaturated group or a ring-opening polymerizable group.

Examples of the polymerizable group are as follows.

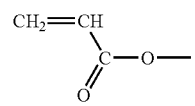

(8)

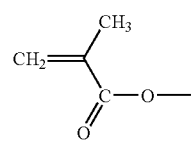

(9)

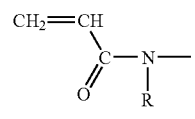

(10)

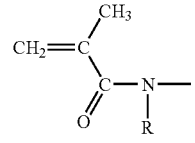

(11)

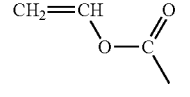

(12)

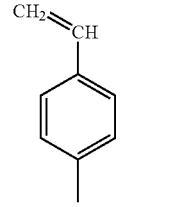

(13)

-continued

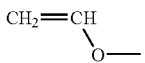

(14)

In the General Formulas (10) and (11), R is a hydrogen atom or a substituent.

The polymerizable group is preferably any one of the following polymerizable groups P1, P2, P3 and P4.

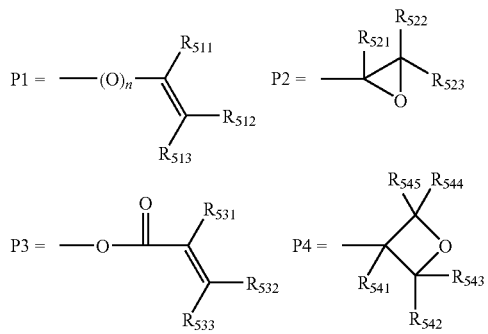

In the polymerizable group P1, $R_{511}$ and $R_{513}$ may be the same or different, and each represent a hydrogen atom or an alkyl group.

Examples of the alkyl group in $R_{511}$ and $R_{513}$ include methyl, ethyl, n-propyl, isopropyl, n-butyl, pentyl, hexyl, heptyl, octyl, and nonyl. Of these, a lower alkyl group, such as methyl and ethyl is preferable, with methyl being more preferable.

A combination of $R_{511}$ and $R_{513}$ is preferably a combination where $R_{511}$ is methyl group and $R_{513}$ is a hydrogen atom or a combination where both $R_{511}$ and $R_{513}$ are hydrogen atoms.

In the polymerizable group P1, $R_{512}$ represents a hydrogen atom, a substituted or nonsubstituted alkyl group, and is preferably a hydrogen atom or a substituted or nonsubstituted lower alkyl group, more preferably a hydrogen atom.

Examples of the alkyl group as $R_{512}$ include methyl, ethyl, n-propyl, isopropyl, n-butyl, pentyl, hexyl, heptyl, octyl, nonyl, 2-chloroethyl, 3-methoxyethyl, and methoxyethoxyethyl. Of these, a lower alkyl group such as methyl and ethyl is preferable, with methyl being more preferable.

Accordingly, as the polymerizable group P1, it is preferable to use a nonsubstituted vinyloxy group which is a functional group having a high polymerization activity.

The polymerizable group P1 may be bound to, for example, an alkoxy group, an alkoxycarbonyl group, an alkoxycarbonyloxy group residual group.

When the polymerizable group P1 is bound to an alkoxy group, an alkoxycarbonyl group or an alkoxycarbonyloxy group residual group, an alkyleneoxy group, an alkyleneoxycarbonyloxy group or an alkyleneoxycarbonyl group is respectively formed.

Examples of the alkyleneoxy group include an alkyleneoxy group such as ethyleneoxy, propyleneoxy, butyleneoxy, pentyleneoxy, hexyleneoxy, and heptyleneoxy; and a substituted alkyleneoxy group having an ether bond such as ethyleneoxyethoxy.

Examples of the alkyleneoxycarbonyloxy group include an alkyleneoxycarbonyloxy group such as ethyleneoxycarbonyloxy, propyleneoxycarbonyloxy, butyleneoxycarbonyloxy, pentyleneoxycarbonyloxy, hexyleneoxycarbonyloxy, and heptyleneoxycarbonyloxy; and a substituted alkyleneoxycarbonyloxy group having an ether bond such as ethyleneoxyethoxycarbonyloxy.

Examples of the alkyleneoxycarbonyl group include an alkyleneoxycarbonyl group such as ethyleneoxycarbonyl group, propyleneoxycarbonyl group, butyleneoxycarbonyl group, pentyleneoxycarbonyl group, hexyleneoxycarbonyl group, and heptyleneoxycarbonyl group; and a substituted alkyleneoxycarbonyl group having an ether bond such as ethyleneoxyethoxycarbonyl group.

The polymerizable group P1 may directly bind to an aromatic ring.

In the polymerizable group P1, n represents 0 or 1, with 1 being preferable. When n is 1, the polymerizable group P1 is a substituted or nonsubstituted vinyl ether group.

The polymerizable group P2 represents a substituted or nonsubstituted oxyrane group.

In the polymerizable group P2, $R_{521}$ and $R_{522}$ may be the same or different and each represent a hydrogen atom or an alkyl group. It is preferable that $R_{521}$ and $R_{522}$ are both hydrogen atoms.

Examples of the alkyl group in the $R_{521}$ and $R_{522}$ include methyl, ethyl, n-propyl, isopropyl, n-butyl, pentyl, hexyl, heptyl, octyl, and nonyl. Of these, a lower alkyl such as methyl and ethyl is preferable, with methyl being more preferable.

In the polymerizable group P2, $R_{523}$ represents a hydrogen atom or substituted or nonsubstituted alkyl group.

Examples of the alkyl group in the $R_{523}$ include methyl, ethyl, n-propyl, isopropyl, n-butyl, pentyl, hexyl, heptyl, octyl, nonyl, 2-chloroethyl, 3-methoxyethyl, and methoxyethoxyethyl. Of these, a lower alkyl group such as methyl and ethyl is preferable, with methyl being more preferable.

The polymerizable group P3 represents a substituted or nonsubstituted acryl group.

In the polymerizable group P3, $R_{531}$ and $R_{533}$ may be the same of different and each represents a hydrogen atom or an alkyl group.

Examples of the alkyl group in the $R_{531}$ and $R_{533}$ include methyl, ethyl, n-propyl, isopropyl, n-butyl, pentyl, hexyl, heptyl, octyl, and nonyl. Of these, a lower alkyl group such as methyl and ethyl is preferable, with methyl being more preferable.

The combination of $R_{531}$ and $R_{533}$ is preferably a combination in which $R_{531}$ is methyl and $R_{533}$ is a hydrogen atom, or a combination in which both $R_{531}$ and $R_{533}$ are hydrogen atoms.

In the polymerizable group P3, $R_{532}$ represents a hydrogen atom or a substituted or nonsubstituted alkyl group, with a hydrogen atom being preferable.

Examples of the alkyl group include methyl, ethyl, n-propyl, isopropyl, n-butyl, pentyl, hexyl, heptyl, octyl, nonyl, 2-chloroethyl, 3-methoxyethyl, and methoxyethoxyethyl. Of these, a lower alkyl group such as methyl and ethyl is preferable, with methyl being more preferable.

Thus, as the polymerizable group P3, it is preferable to use a functional group having high polymerization activity, such as nonsubstituted acryloxy group, methacryloxy group, and crotonyloxy.

The polymerizable group P4 represents a substituted or nonsubstituted oxetane group In the polymerizable group P4, $R_{542}$, $R_{543}$, $R_{544}$, and $R_{545}$ may be the same or different and each represent a hydrogen atom or an alkyl group. Of these, it is preferable to use a combination in which $R_{542}$, $R_{543}$, $R_{544}$ and $R_{545}$ are all hydrogen atoms.

Examples of the alkyl group in the $R_{542}$, $R_{543}$, $R_{544}$, and $R_{545}$ include methyl, ethyl, n-propyl, isopropyl, n-butyl, pentyl, hexyl, heptyl, octyl, and nonyl. Of these, preferable is a lower alkyl group such as methyl and ethyl, with methyl being more preferable.

In the polymerizable group P4, $R_{541}$ represents a hydrogen atom, a substituted or nonsubstituted alkyl group.

Examples of the alkyl group in the $R_{541}$ include methyl, ethyl, n-propyl, isopropyl, n-butyl, pentyl, hexyl, heptyl, octyl, nonyl, 2-chloroethyl, 3-methoxyethyl, and methoxyethyl. Of these, a lower alkyl group such as methyl and ethyl is preferable, with methyl being more preferable.

In the General Formula (I), $L_1$ and $L_2$ may be the same of different, and each represent a divalent spacer group.

The divalent spacer group is not particularly limited and may be appropriately selected depending on the purpose. It is preferable to use a single bond or an alkylene having 1 to 20 carbon atoms. The —$CH_2$— in the alkyl group may be replaced with any of —O—, —S—, —COO—, —OCO—, —CH=CH—, —CF=CF— and —C≡C—. The hydrogen atom in the alkylene group may be replaced with a halogen atom.

In the General Formula (I), $Z_1$, $Z_2$, $Z_3$ and $Z_4$ may be the same or different and each represent a divalent connecting group.

The divalent connecting group is not particularly limited and may be appropriately selected depending on the purpose. Preferable examples are the following.

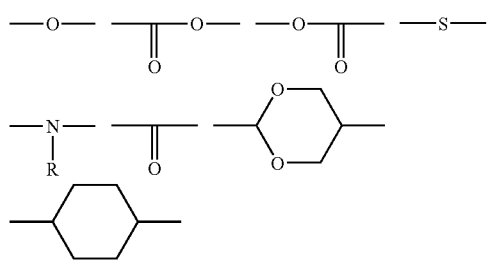

In the General Formula (I), $A_1$ and $A_2$ may be the same or different and each represent a divalent cyclic group.

The divalent cyclic group is not particularly limited and may be appropriately selected depending on the purpose. The divalent cyclic group is preferably any one of a substituted or nonsubstituted phenyl group, and a substituted or nonsubstituted cyclohexyl group, more preferably any one of a phenyl group having a substituent and a cyclohexyl group having a substituent, still more preferably any one of a phenyl group having a substituent at 4-position and a cyclohexyl group having a substituent at 4-position, even more preferably any one of a phenyl group having, at 4-position, a benzoyloxy group having a substituent at 4-position, and a phenyl group having, at 4-position, a cyclohexyl group having a substituent at 4-position, a cyclohexyl group having, at 4-position, a phenyl group having a substituent at 4-position, and a cyclohexyl group having, at 4-position, a cyclohexyl group having a substituent at 4-position.

The cyclohexyl group having a substituent at 4-position has stereoisomers of cis form and trans form. Either cis form or trans form, or a mixture of cis form and trans form may be used. Of these, a trans form cyclohexyl group is preferable.

In the General Formula (I), m and n may be the same or different, and each represent an integer of 0 to 3.

In the General Formula (I), $K_2$ represents any one of a hydrogen atom, an alkyl group, a substituent or a polymerizable group.

The polymerizable group in $K_2$ is not particularly limited and may be appropriately selected depending on the purpose. The polymerizable group in $K_2$ may be the same as or different from that in $K_1$, and is preferably any one of the polymerizable groups P1 to P4.

In the General Formula (I), M represents a group represented by any one of groups represented by the following General Formulas (2) to (7).

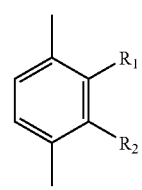

(2)

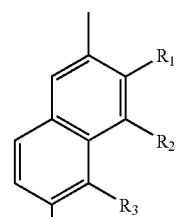

(3)

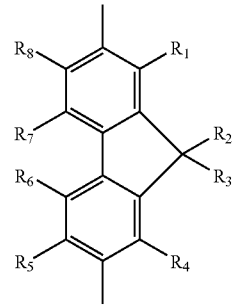

(4)

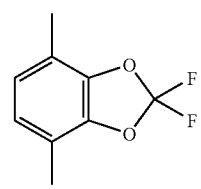

(5)

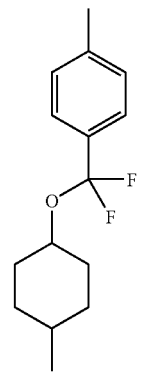

(6)

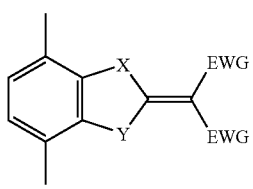

(7)

In the General Formulas (2) to (4), $R_1$ to $R_8$ each represent any one of a hydrogen atom, a fluorine atom, $CF_3$ and CN.

In the General Formula (2), at least one of $R_1$ and $R_2$ is not a hydrogen atom.

In the General Formula (3), at least one of $R_1$ to $R_3$ is not a hydrogen atom.

In the General Formula (4), at least one of $R_1$ to $R_8$ is not a hydrogen atom.

In the General Formula (7), X and Y each represent an oxygen atom, a sulfur atom, $NR_{100}$ and CO. Of these, preferable is an oxygen atom, a sulfur atom or $NR_{100}$.

$R_{100}$ of $NR_{100}$ represents a hydrogen atom or an alkyl group having 1 to 4 carbon atoms.

The EWG in the General Formula (7) represents an electron withdrawing group.

The electron withdrawing group is not particularly limited and may be selected appropriately depending on the purpose, and is preferably an electron withdrawing group having a Hammett's substituent constant $\sigma_p$ value of more than 0, more preferably an electron withdrawing group having a Hammett's substituent constant $\sigma_p$ value of 0 to 1.5.

Examples of the electron withdrawing group include a trifluoromethyl group, a cyano group, a carbonyl group, and a nitro group.

A detailed explanation regarding Hammett's substituent constant $\sigma_p$ and $\sigma_m$ can be found, for example, in Naoki Inamoto, "Hammett's rule—structure and reactivity", published by Maruzen Co., Ltd.; The Japan Chemical Society, "*Shin Jikken Kagaku Kouza* 14 (Lectures on New Experimental Chemistry No. 14), Synthesis and Reaction of Organic Compounds V, published by Maruzen Co., Ltd. p. 2605; Tadao Nakatani, "*Riron Yuuki Kagaku Kaisetsu* (Theoretical Organic Chemistry)", published by Tokyo Kagaku Dojin, p. 217; and "Chemical Review" vol. 91, pp. 165-195 (1991).

Specific examples of the M are shown below, but the M is not limited to these examples.

M-1

M-2

M-3

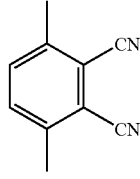

M-4

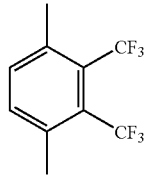

M-5

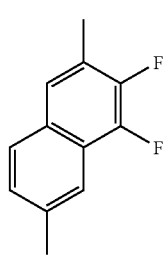

M-6

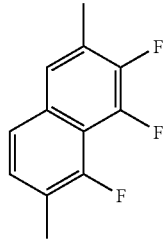

M-7

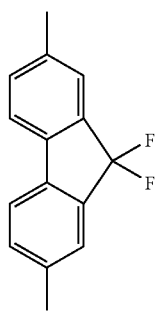

M-8

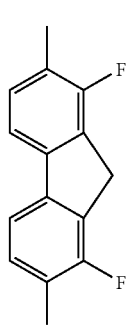

-continued
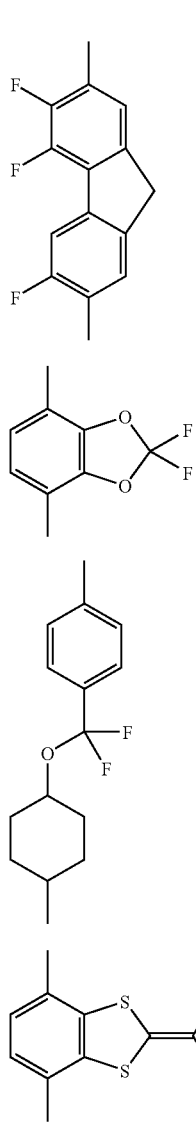
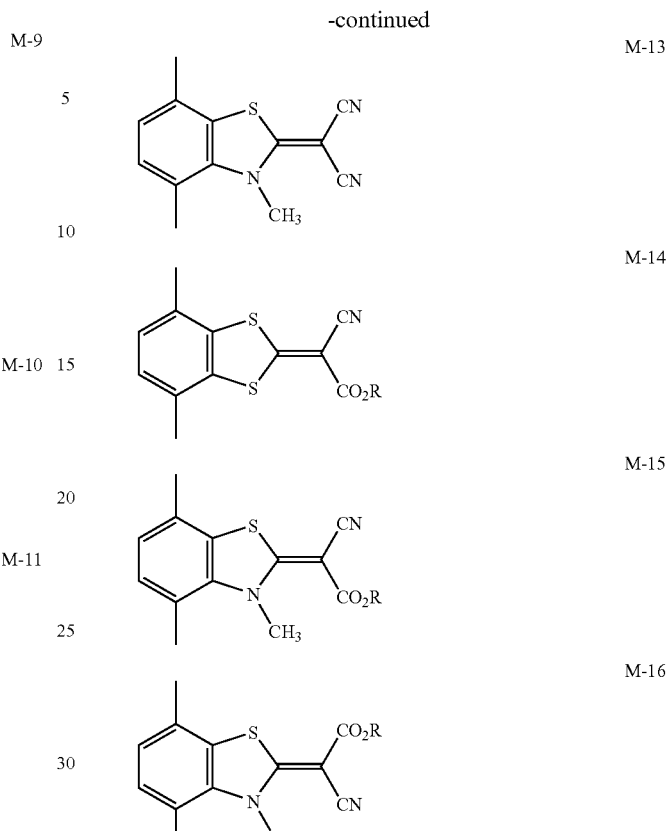
The M is preferably any one of M-2, M-4, M-7, M-10, M-11, M-12 and M-14.
Since the polymerizable liquid crystal compound contains the M, the compound has negative dielectric constant anisotropy.
Examples of the compounds represented by the General Formula (I) are shown below, but the compounds are not limited to these examples.
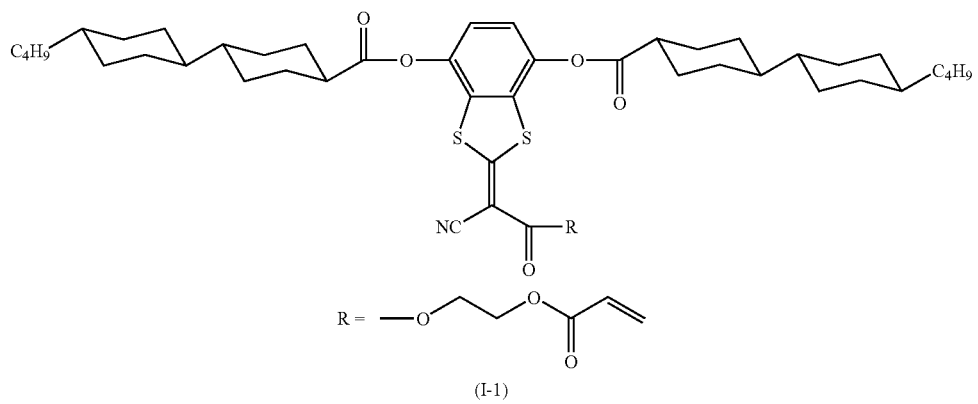
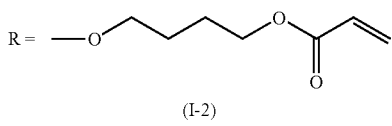

-continued
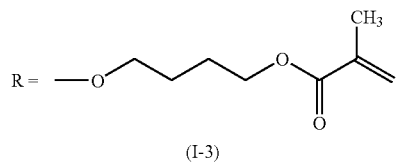
(I-3)
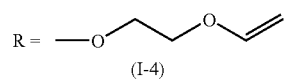
(I-4)
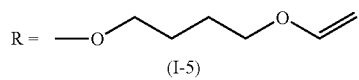
(I-5)
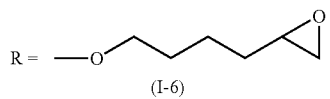
(I-6)
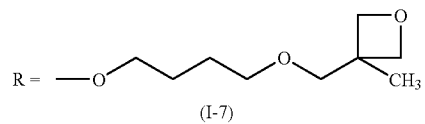
(I-7)
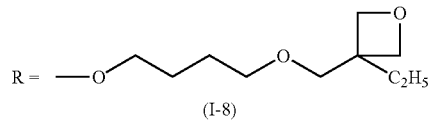
(I-8)
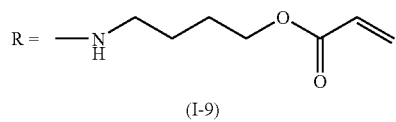
(I-9)
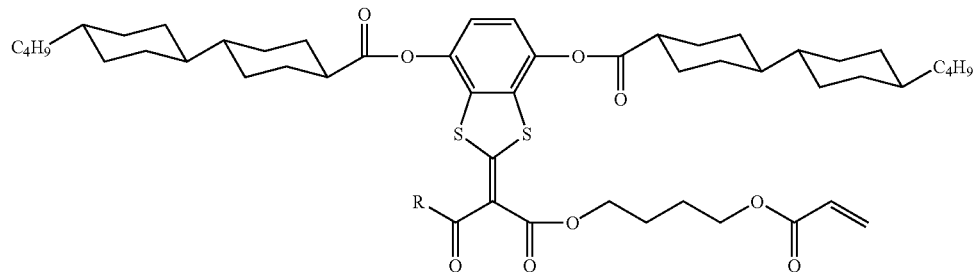
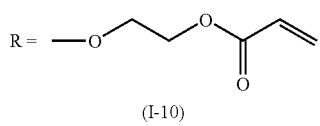
(I-10)
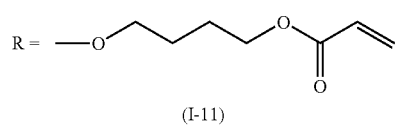
(I-11)

-continued
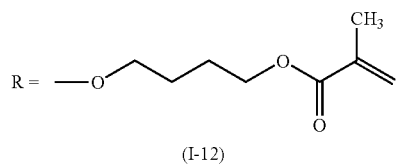
(I-12)
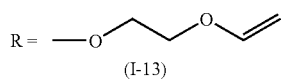
(I-13)
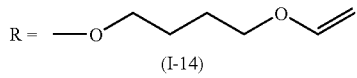
(I-14)
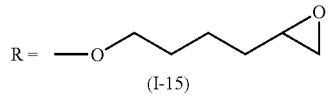
(I-15)
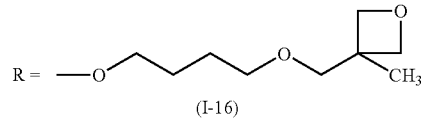
(I-16)
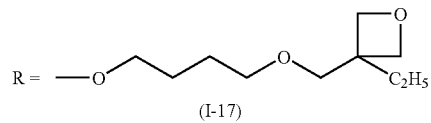
(I-17)
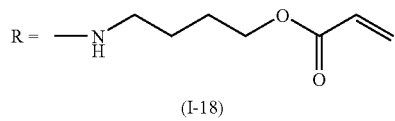
(I-18)
R = —CH$_3$
(I-19)
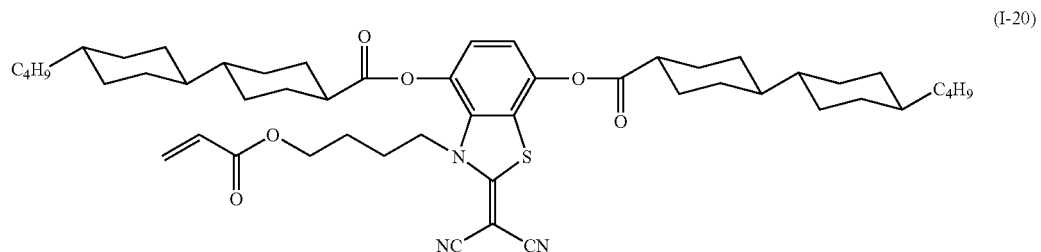
(I-20)
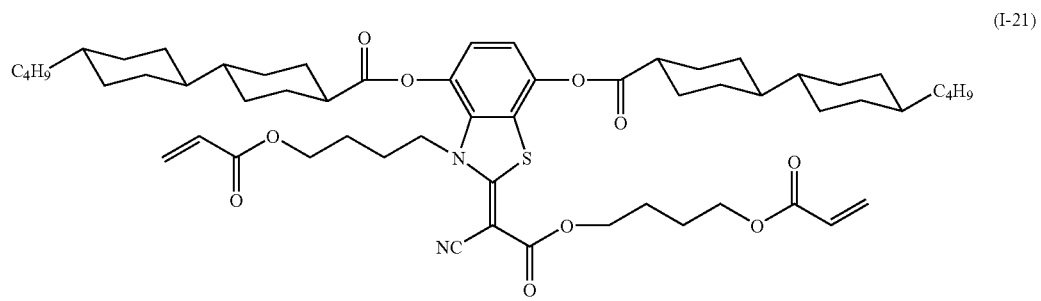
(I-21)

-continued
(I-22)
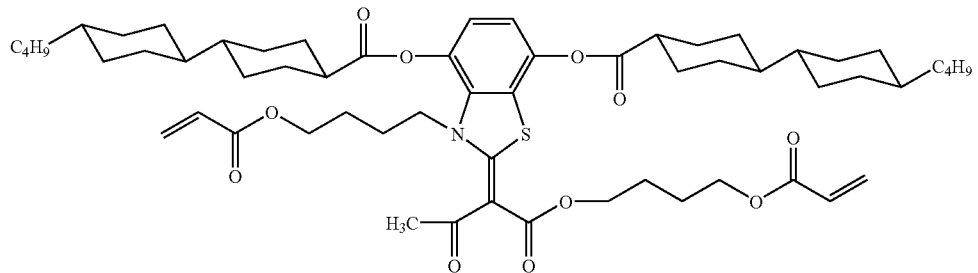
(I-23)
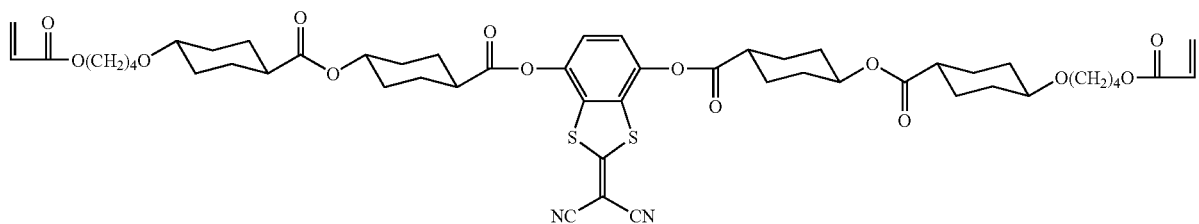
(I-24)
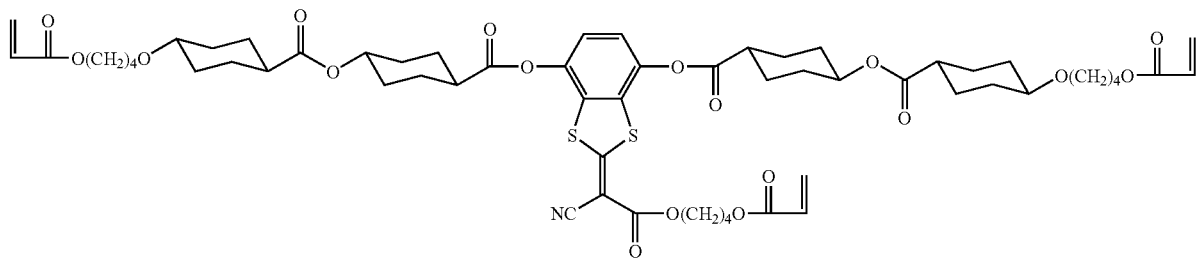
(I-25)
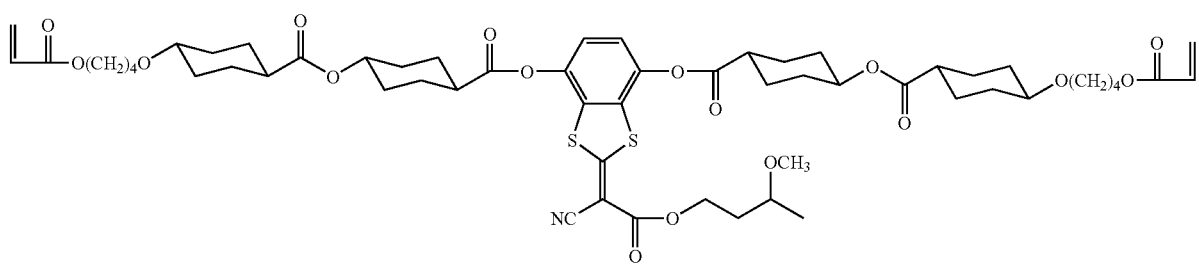
(I-26)
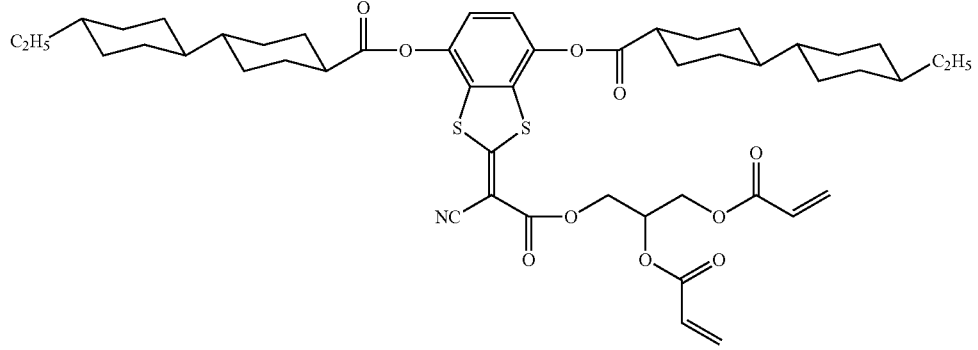

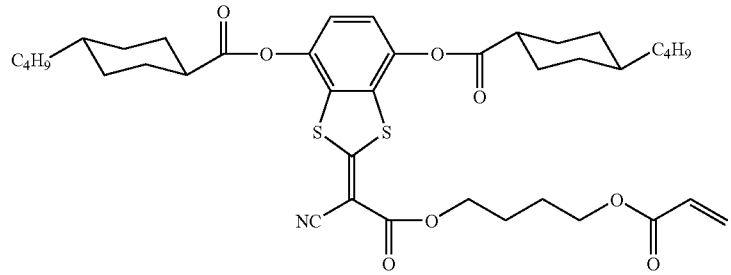
(I-27)
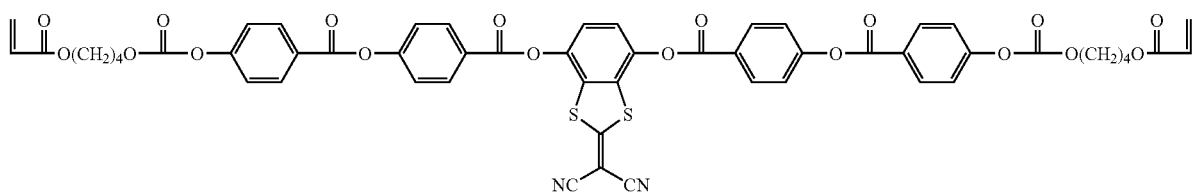
(I-28)
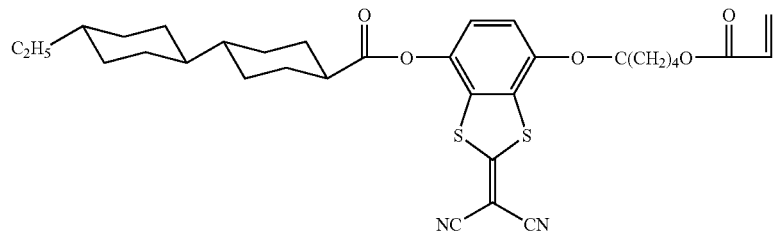
(I-29)
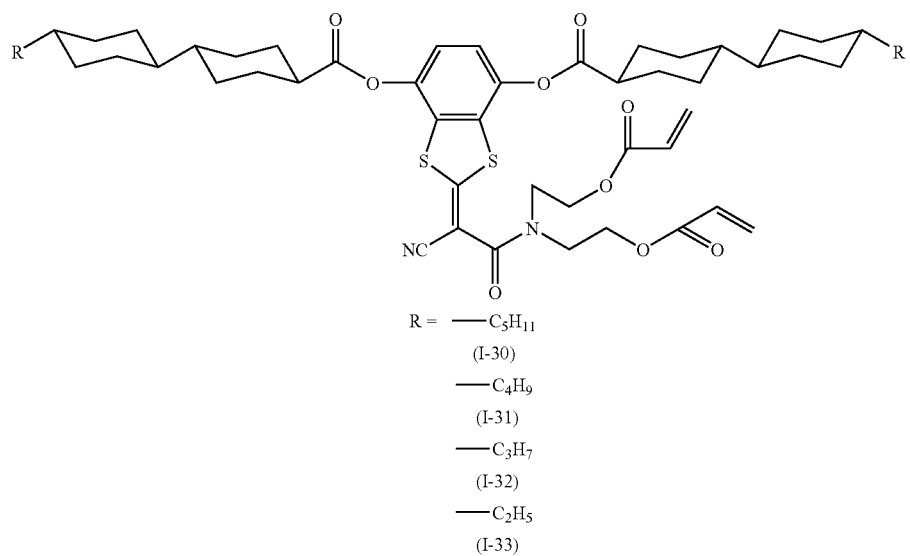
R = —C$_5$H$_{11}$
(I-30)
—C$_4$H$_9$
(I-31)
—C$_3$H$_7$
(I-32)
—C$_2$H$_5$
(I-33)

-continued
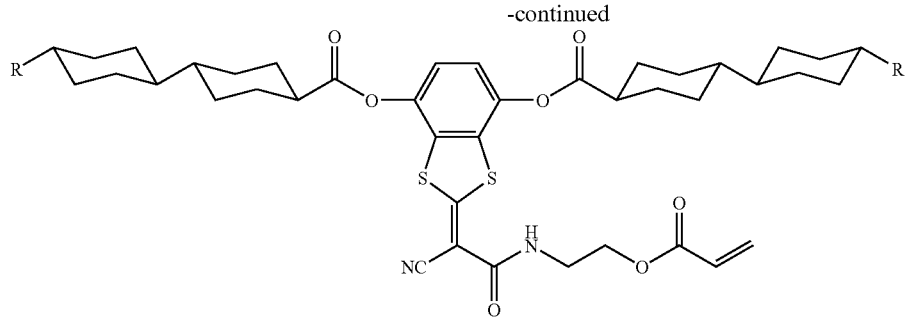
R = —C₅H₁₁ (I-34)
—C₄H₉ (I-35)
—C₃H₇ (I-36)
—C₂H₅ (I-37)
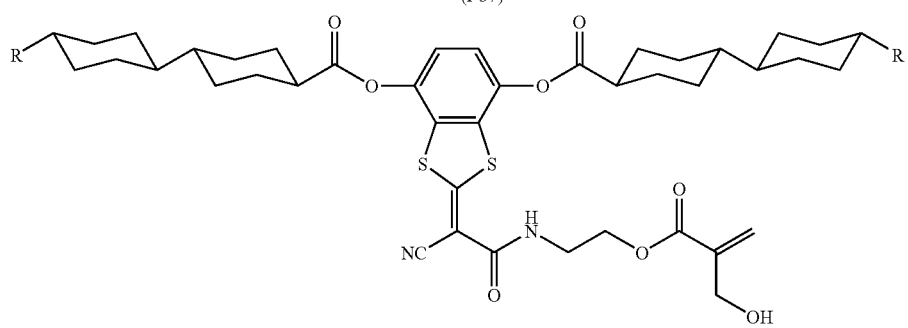
R = —C₅H₁₁ (I-38)
—C₄H₉ (I-39)
—C₃H₇ (I-40)
—C₂H₅ (I-41)
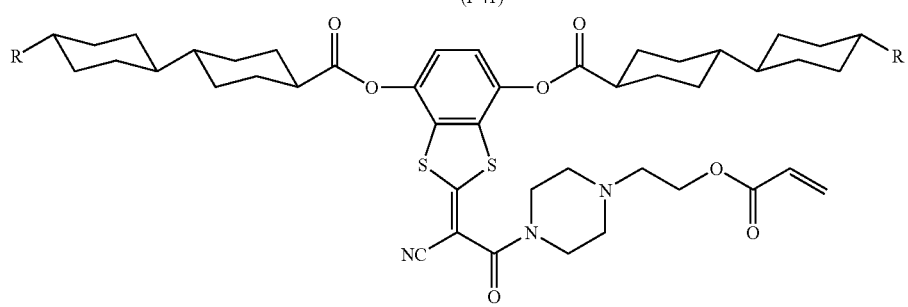
R = —C₅H₁₁ (I-42)
—C₄H₉ (I-43)
—C₃H₇ (I-44)
—C₂H₅ (I-45)

-continued
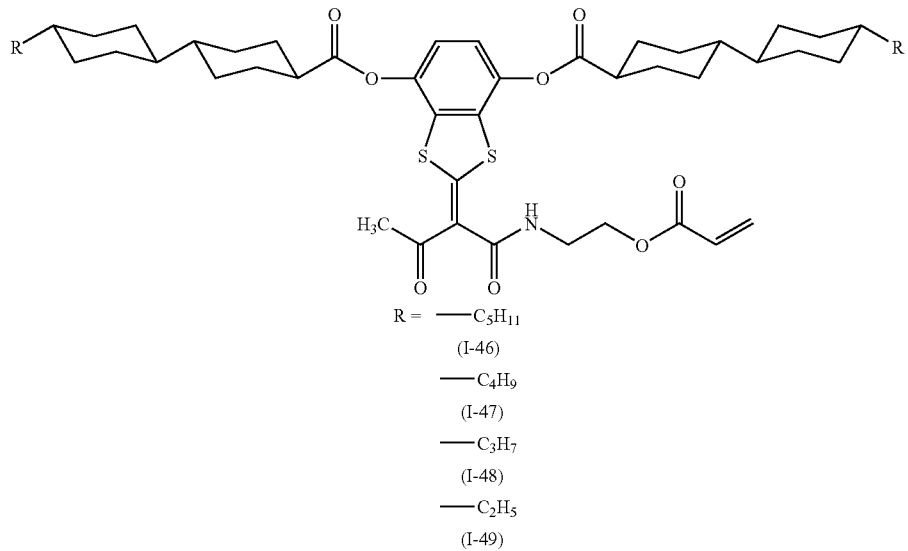
R = —C$_5$H$_{11}$ (I-46)
—C$_4$H$_9$ (I-47)
—C$_3$H$_7$ (I-48)
—C$_2$H$_5$ (I-49)
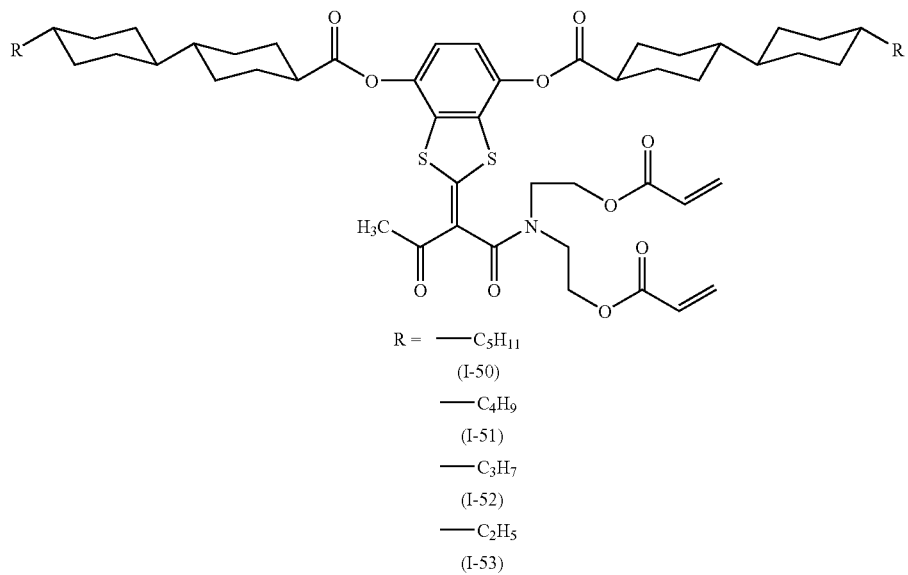
R = —C$_5$H$_{11}$ (I-50)
—C$_4$H$_9$ (I-51)
—C$_3$H$_7$ (I-52)
—C$_2$H$_5$ (I-53)
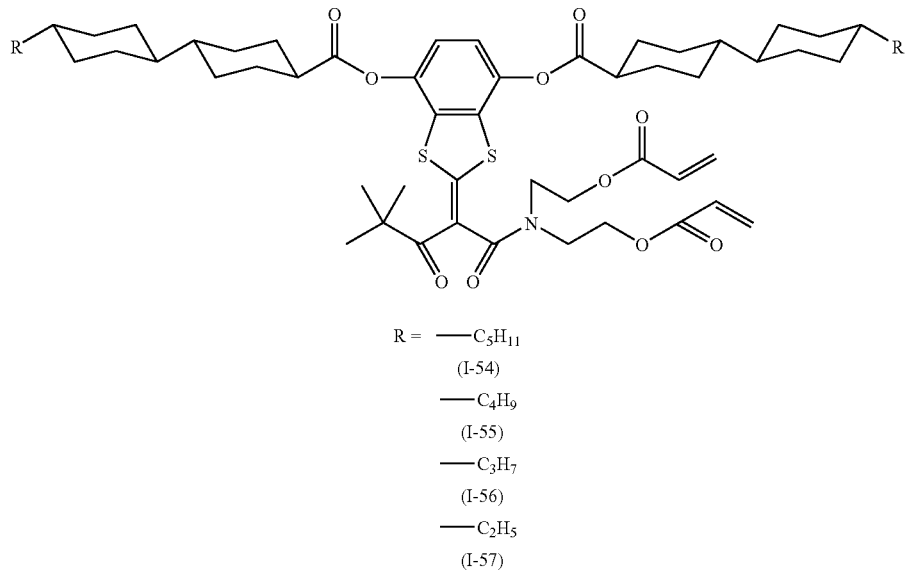
R = —C$_5$H$_{11}$ (I-54)
—C$_4$H$_9$ (I-55)
—C$_3$H$_7$ (I-56)
—C$_2$H$_5$ (I-57)

-continued
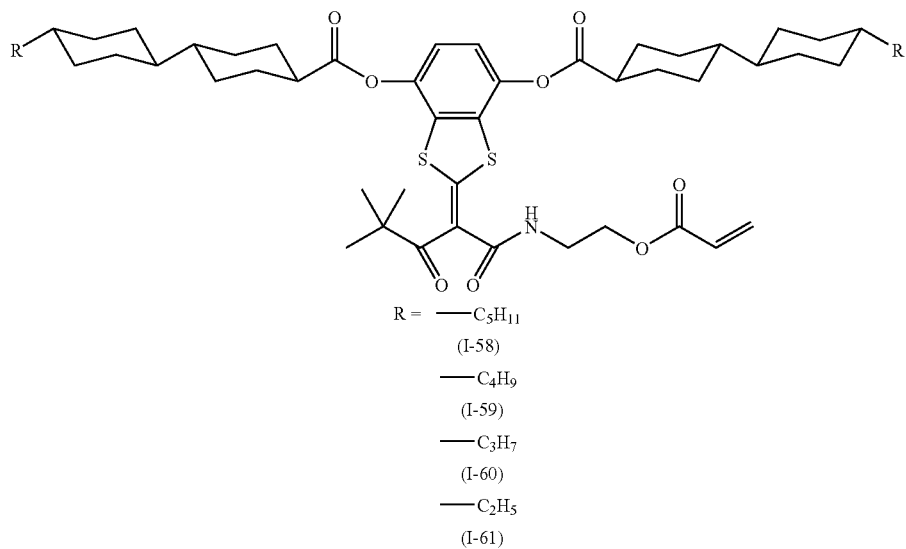
R = —C₅H₁₁ (I-58)
—C₄H₉ (I-59)
—C₃H₇ (I-60)
—C₂H₅ (I-61)
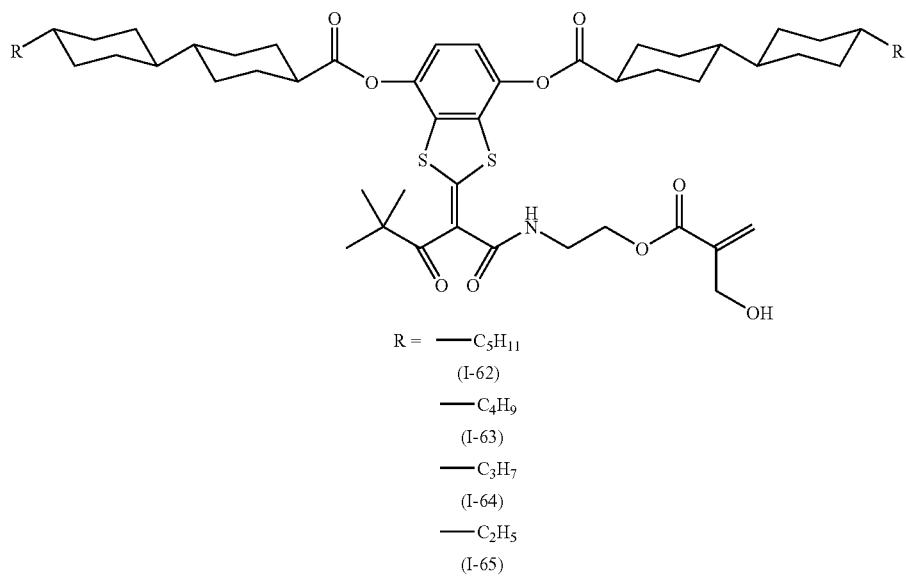
R = —C₅H₁₁ (I-62)
—C₄H₉ (I-63)
—C₃H₇ (I-64)
—C₂H₅ (I-65)
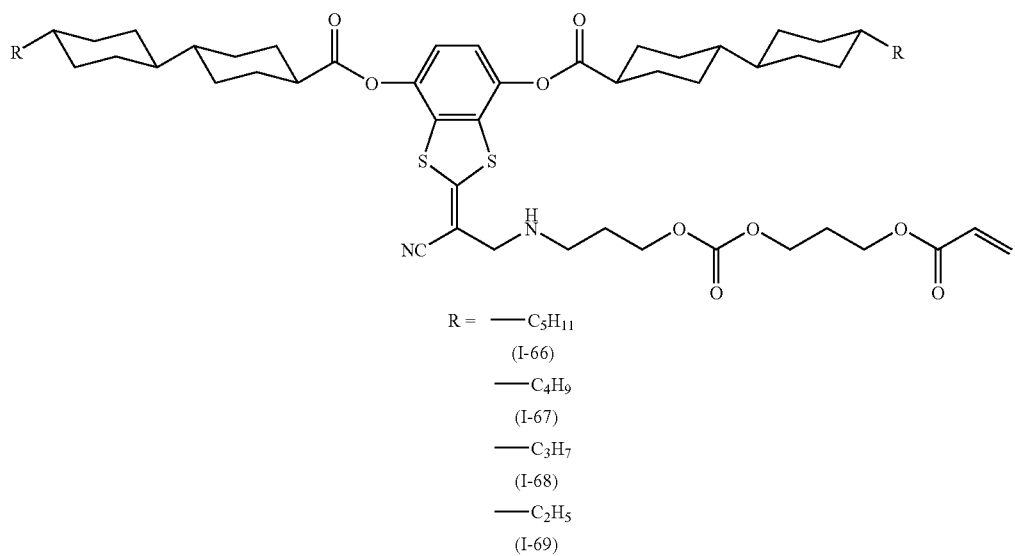
R = —C₅H₁₁ (I-66)
—C₄H₉ (I-67)
—C₃H₇ (I-68)
—C₂H₅ (I-69)

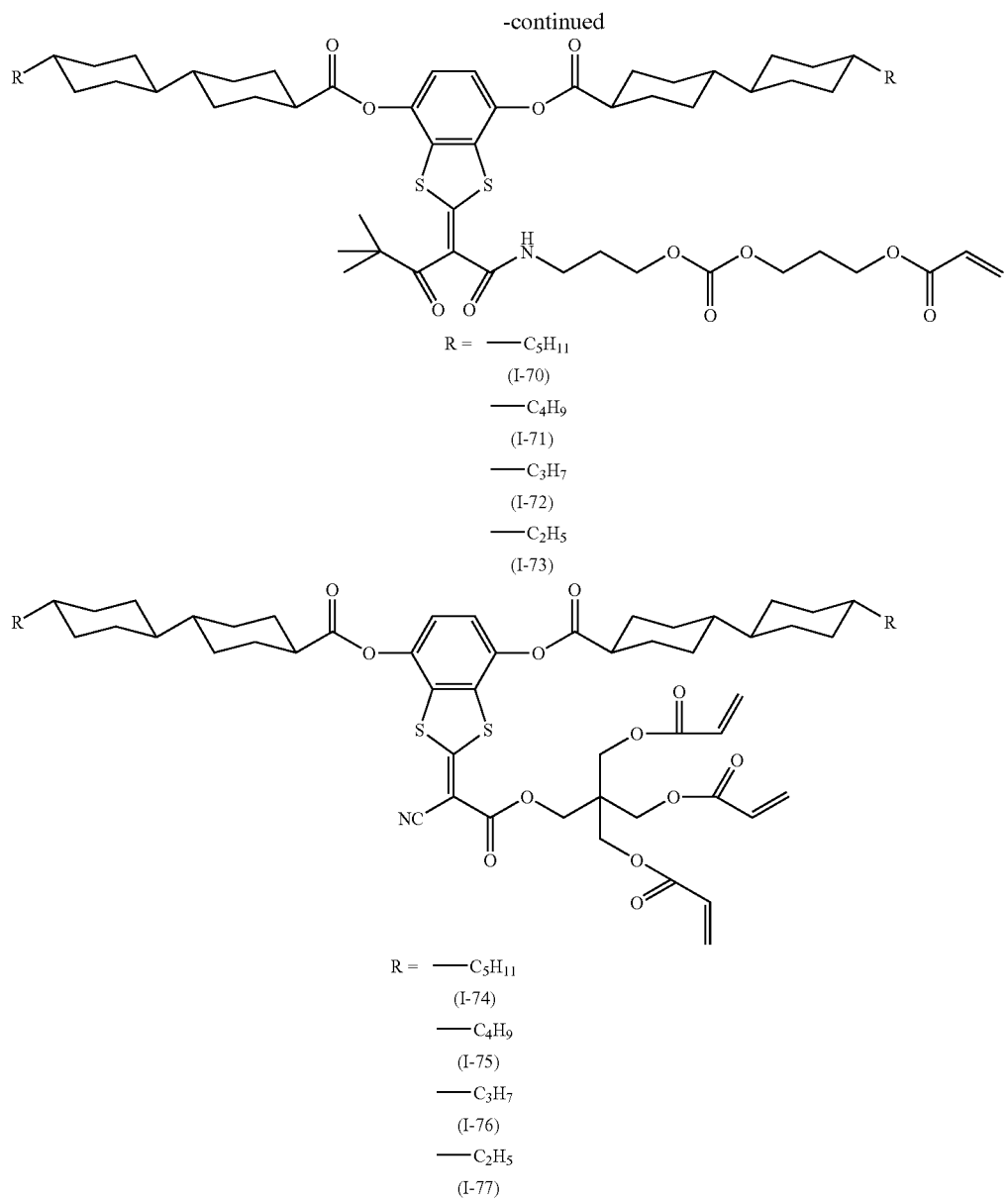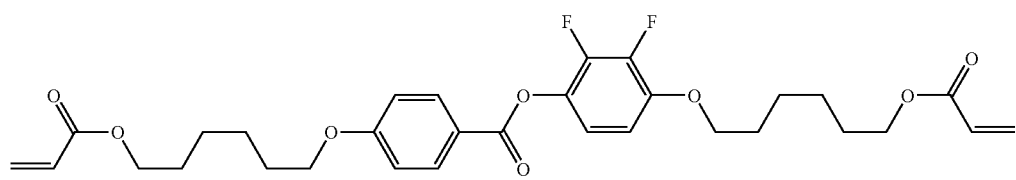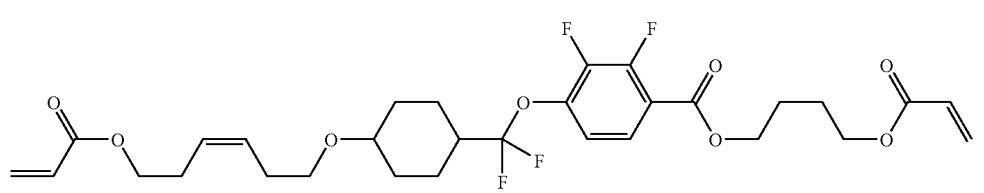

-continued
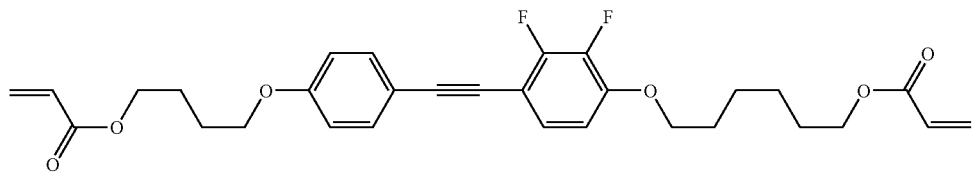
(I-80)
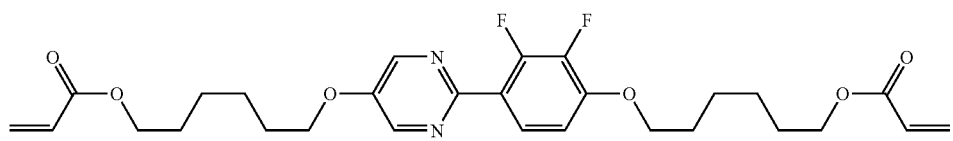
(I-81)
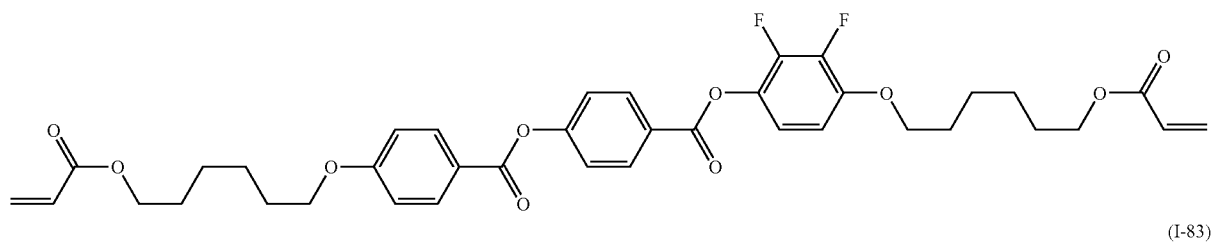
(I-82)
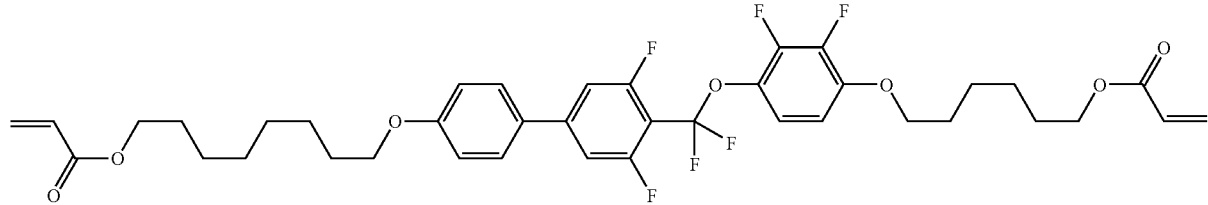
(I-83)
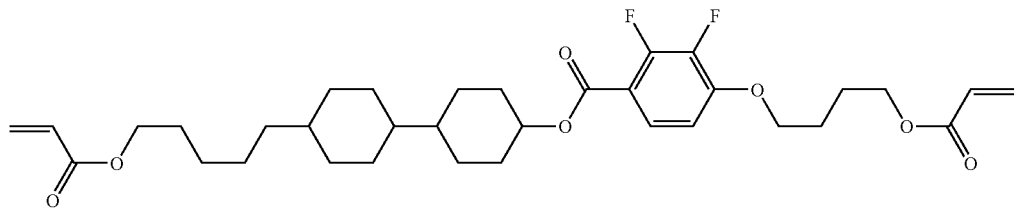
(I-84)
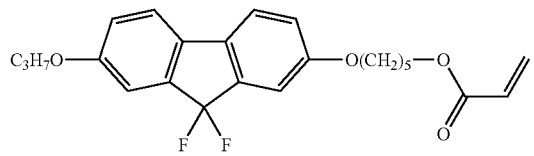
(I-85)
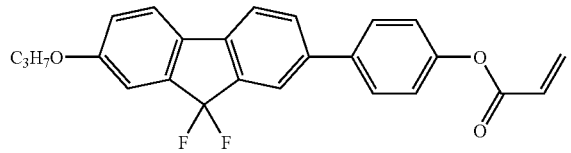
(I-86)
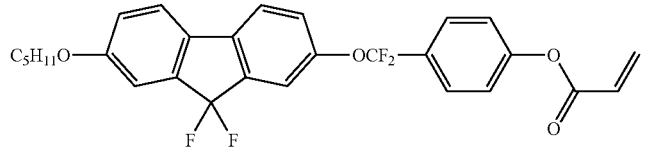
(I-87)

-continued
(I-88)
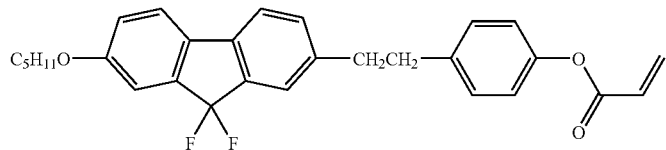
(I-89)
(I-90)
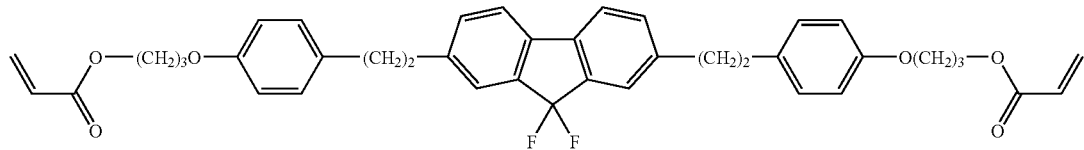
(I-91)
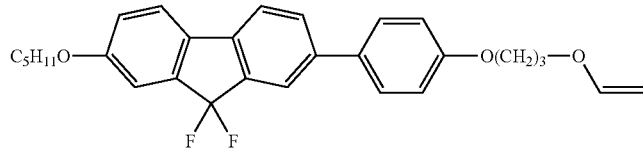
(I-92)
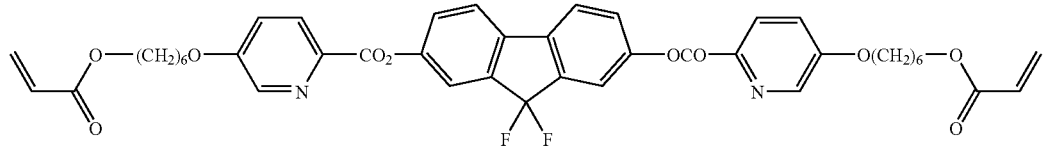
(I-93)
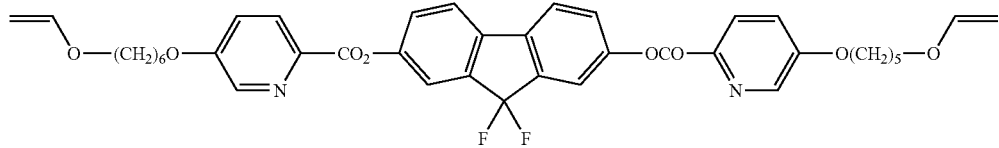
(I-94)
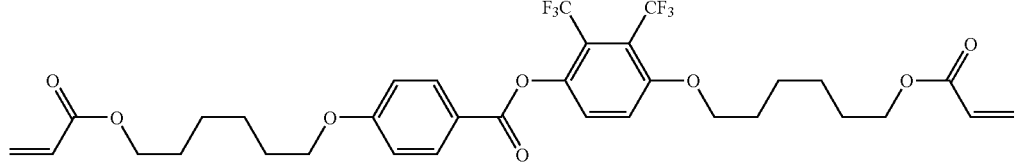
(I-95)
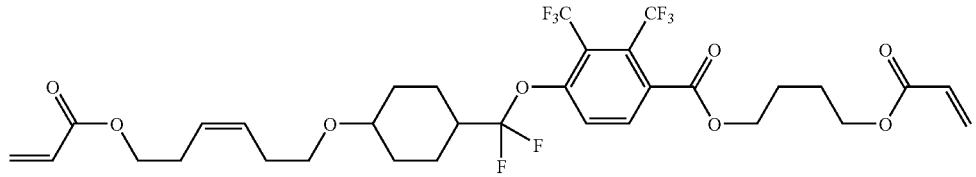
(I-96)
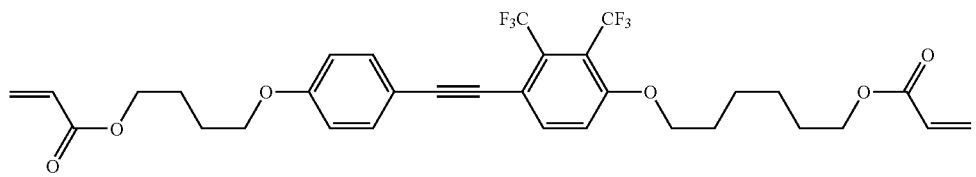

-continued
(I-97)
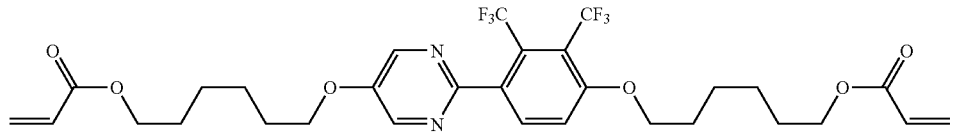
(I-98)
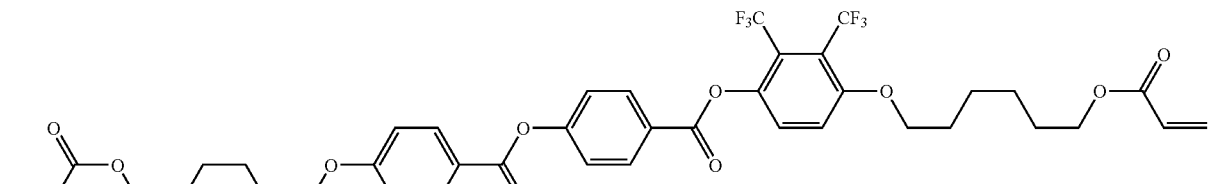
(I-99)
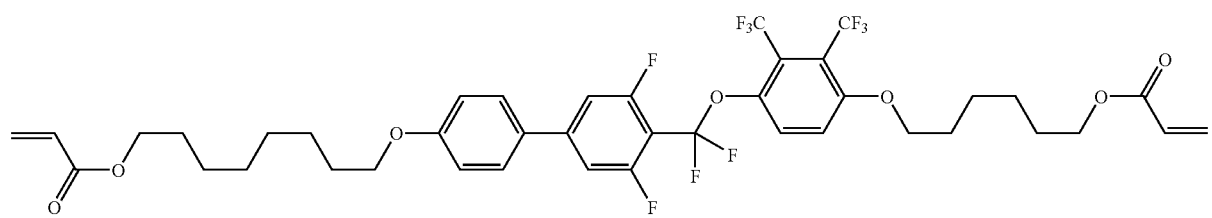
(I-100)
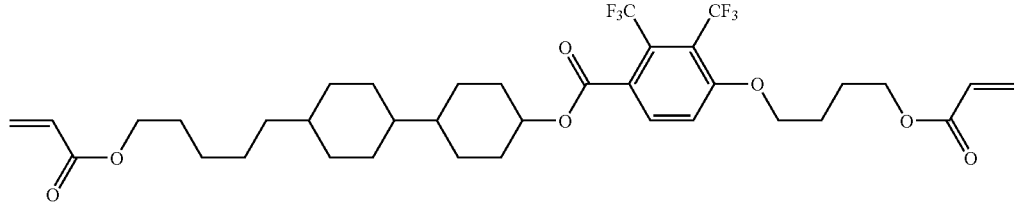
(I-101)
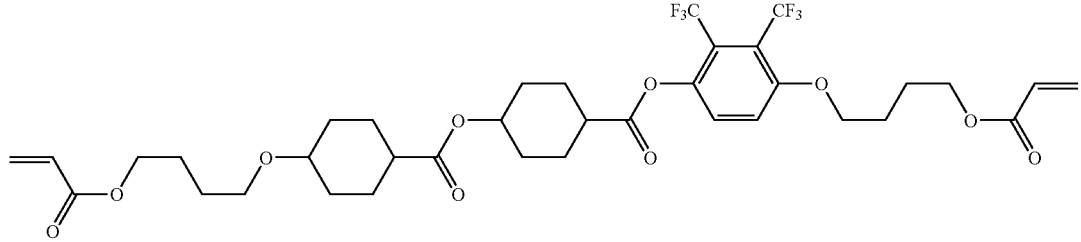
(I-102)
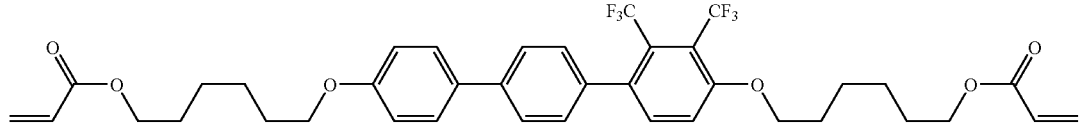
(I-103)
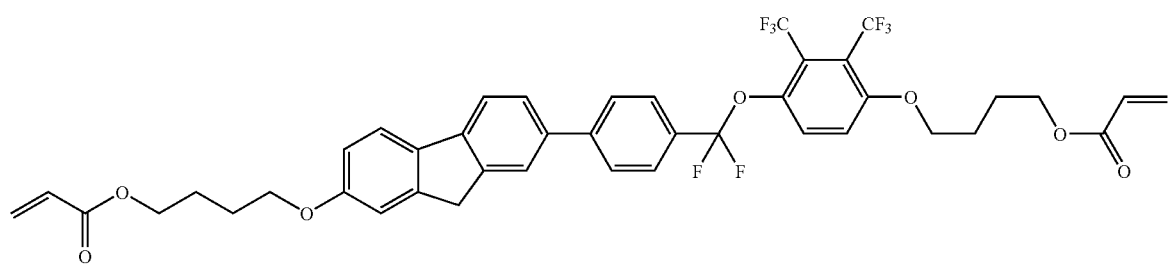

-continued
(I-104)
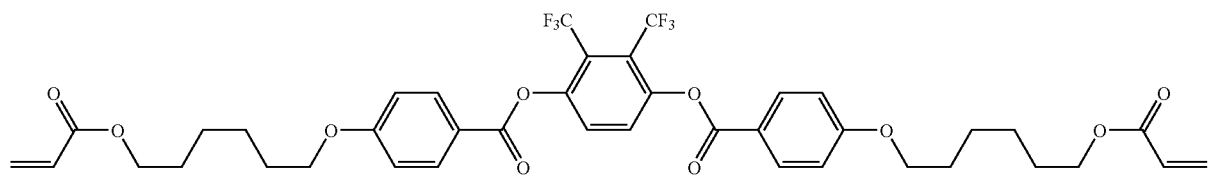
(I-105)
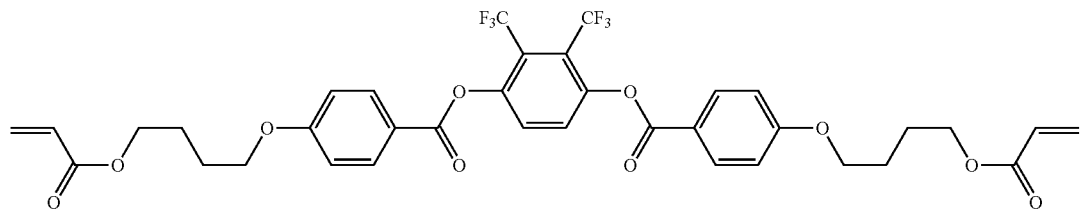
(I-106)
(I-107)
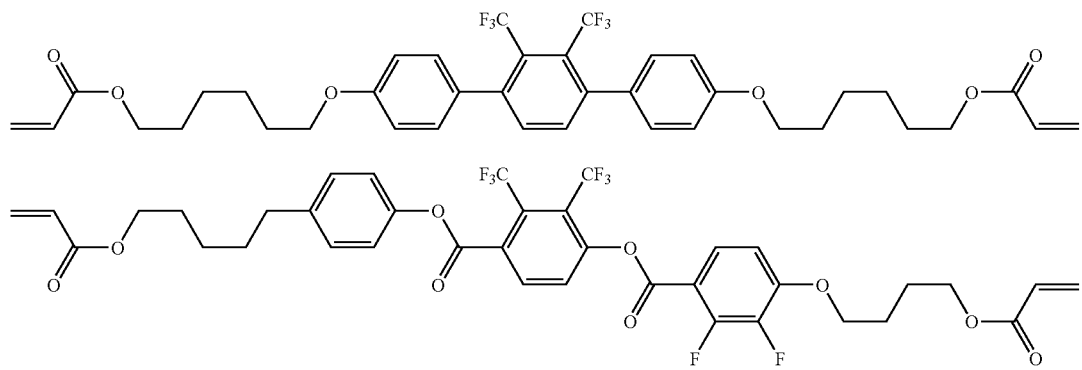
(I-108)
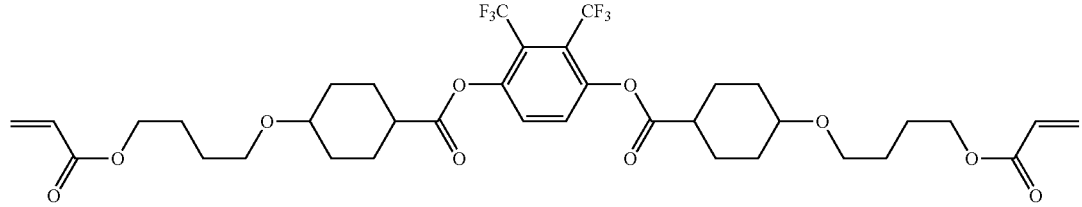
(I-109)
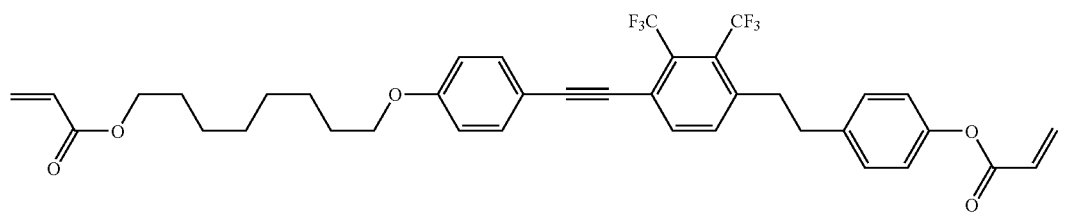
(I-110)
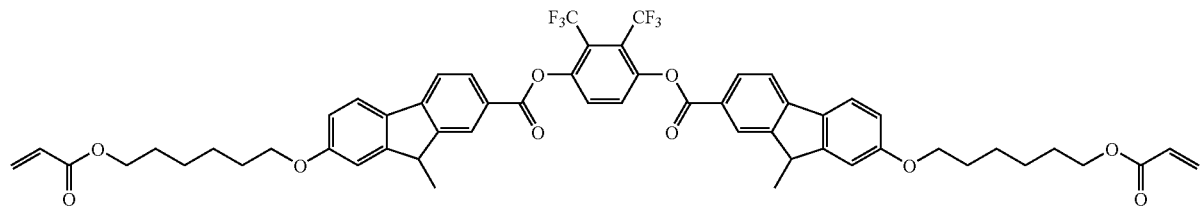

-continued
(I-111)
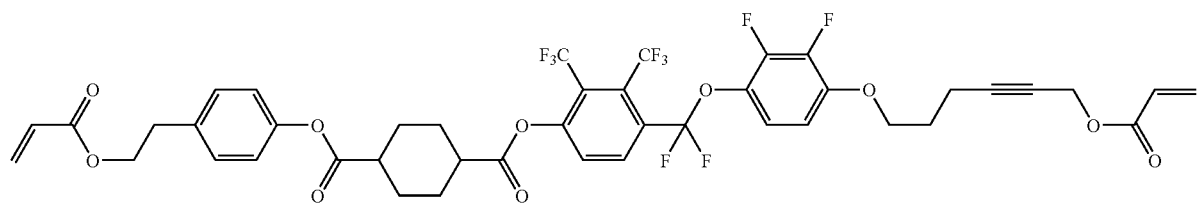
(I-112)
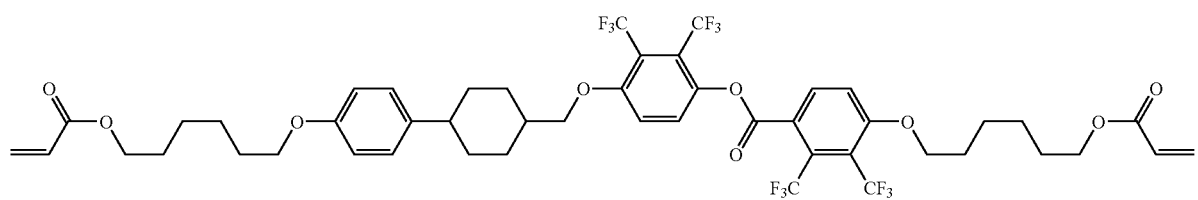
(I-113)
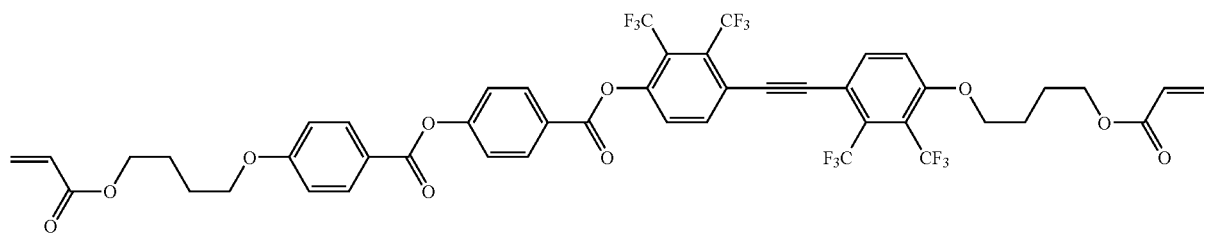
(I-114)
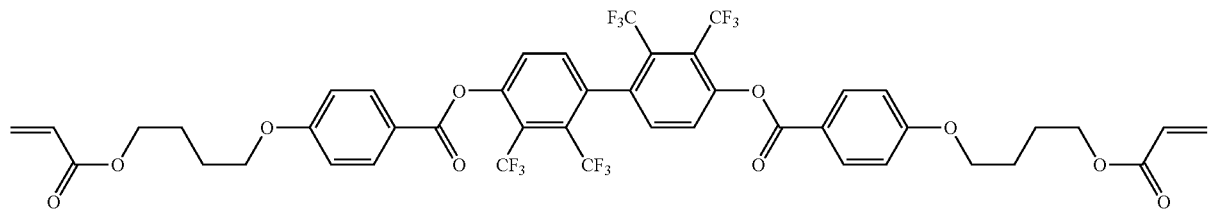
(I-115)
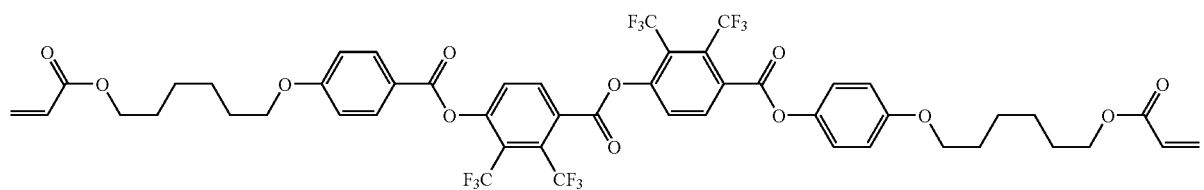
(I-116)
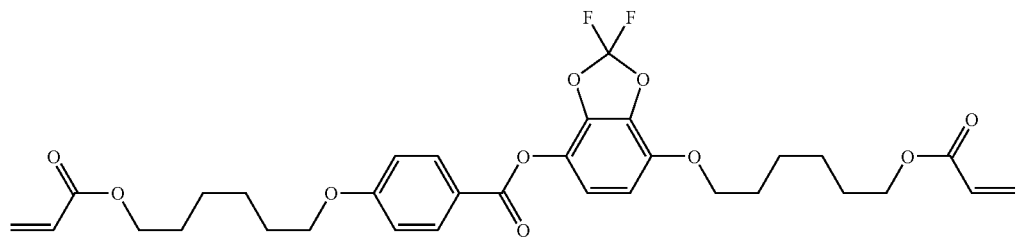

-continued
(I-117)
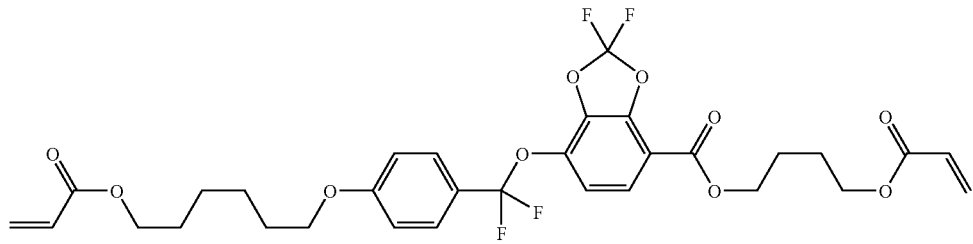
(I-118)
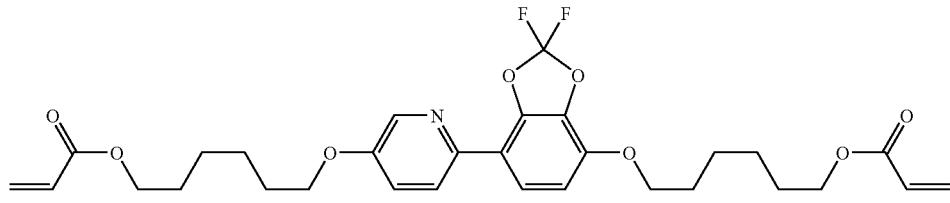
(I-119)
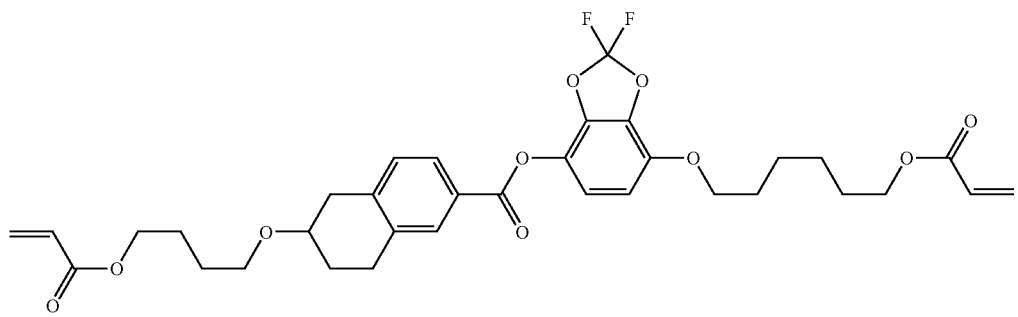
(I-120)
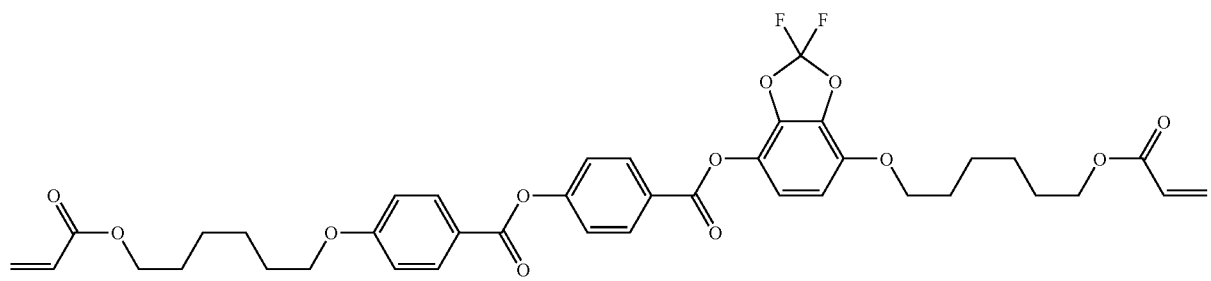
(I-121)
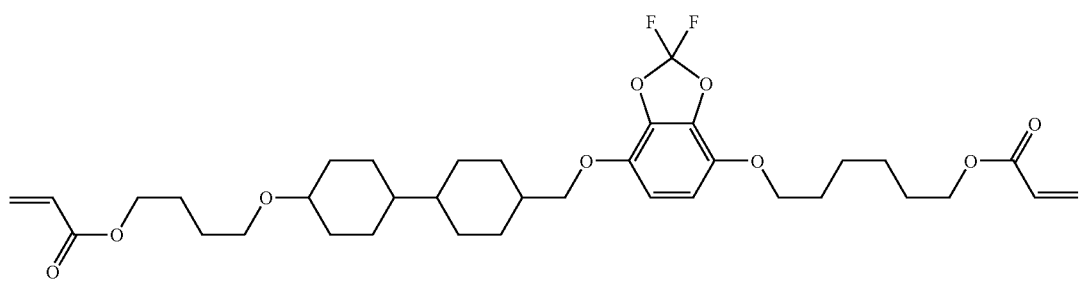
(I-122)
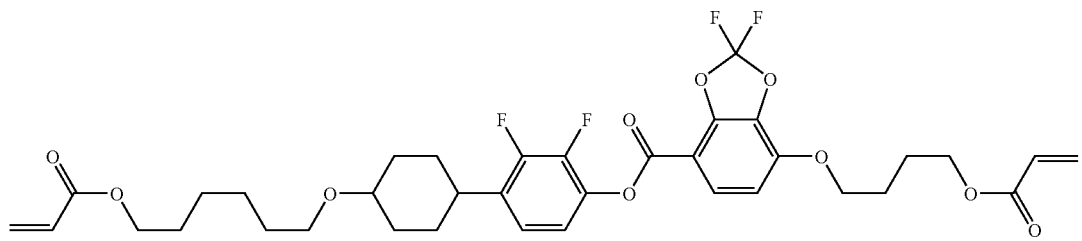

-continued
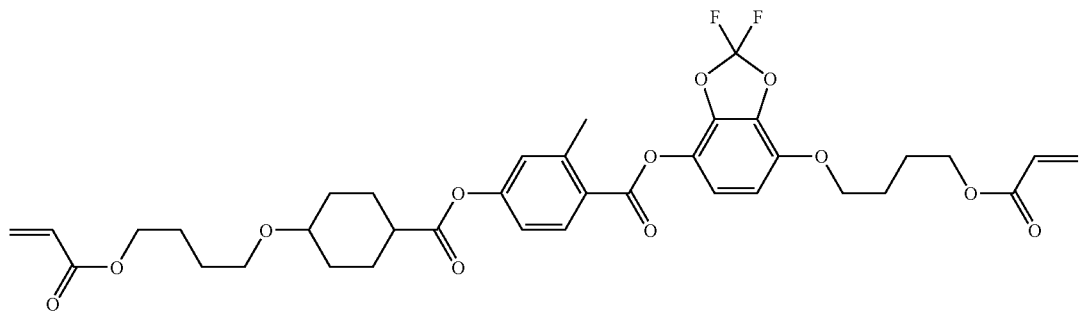
(I-123)
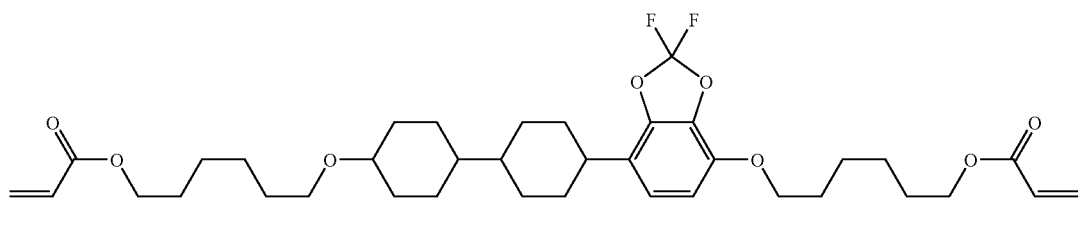
(I-124)
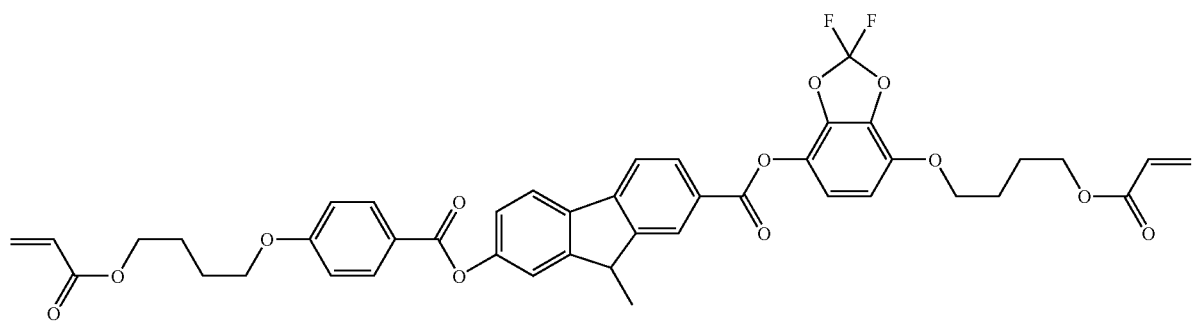
(I-125)
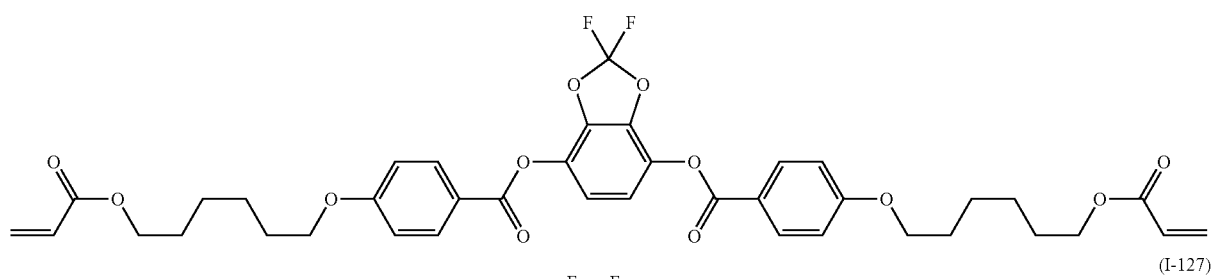
(I-126)
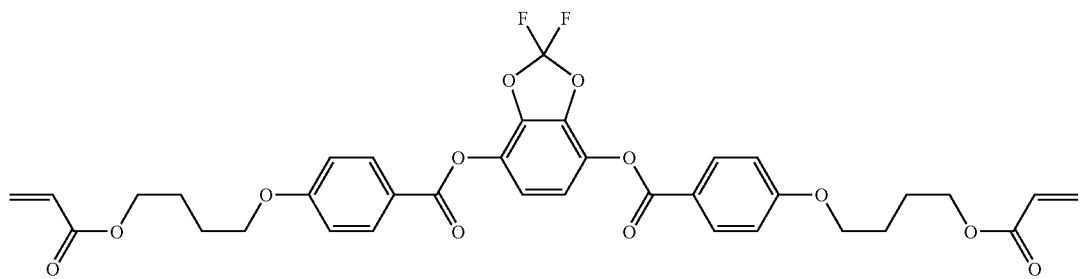
(I-127)
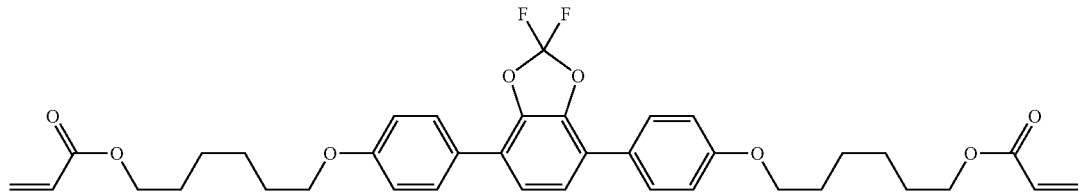
(I-128)

-continued
(I-129)
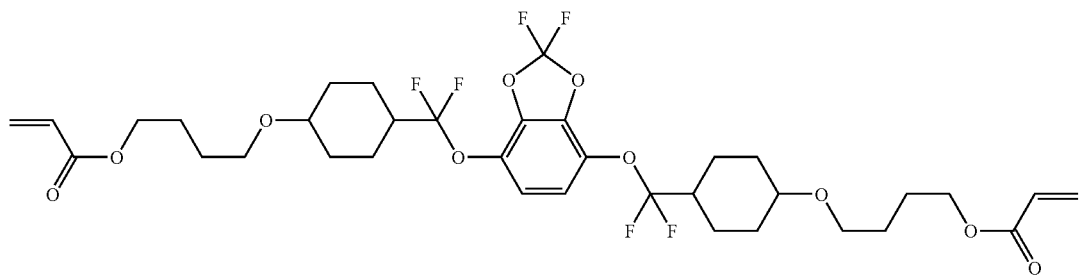
(I-130)
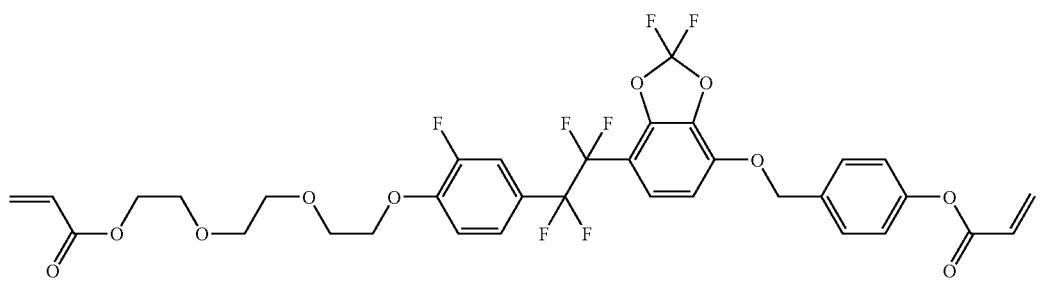
(I-131)
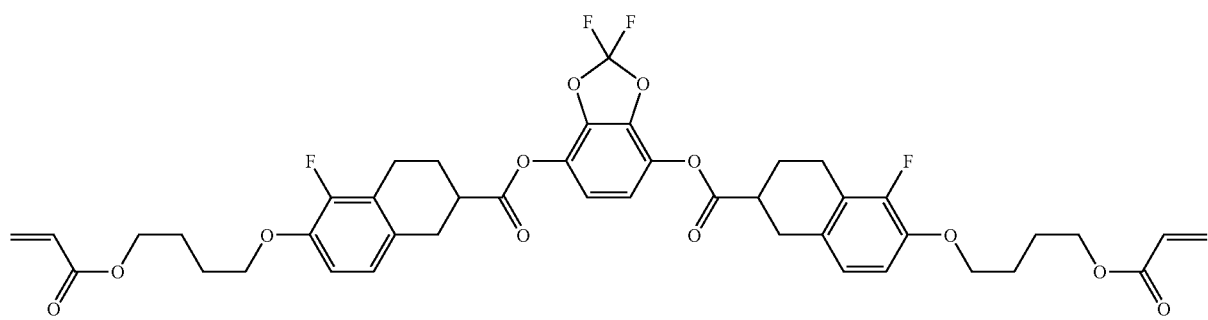
(I-132)
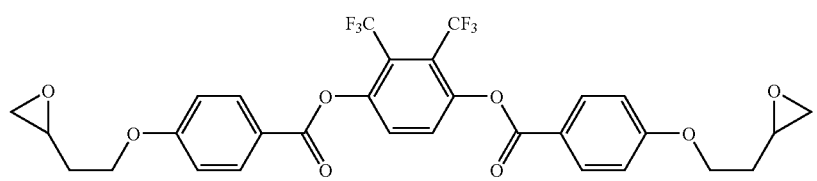
(I-133)
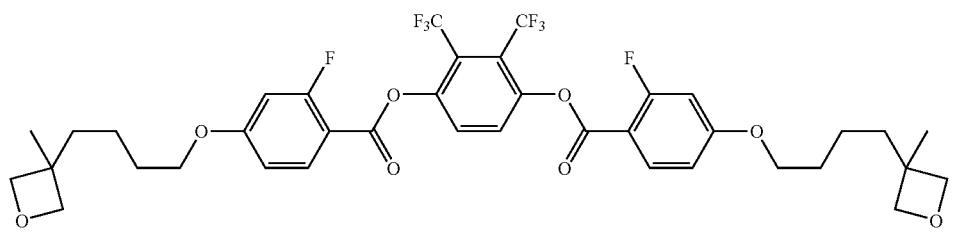
(I-134)
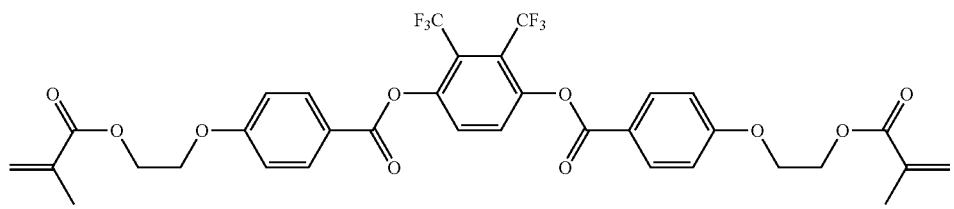

-continued
(I-135)
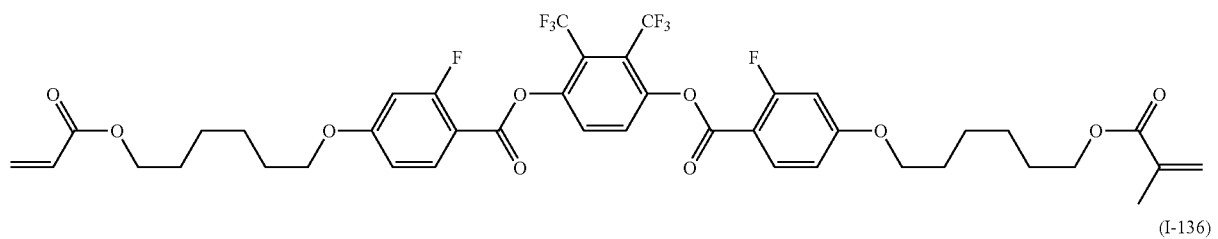
(I-136)
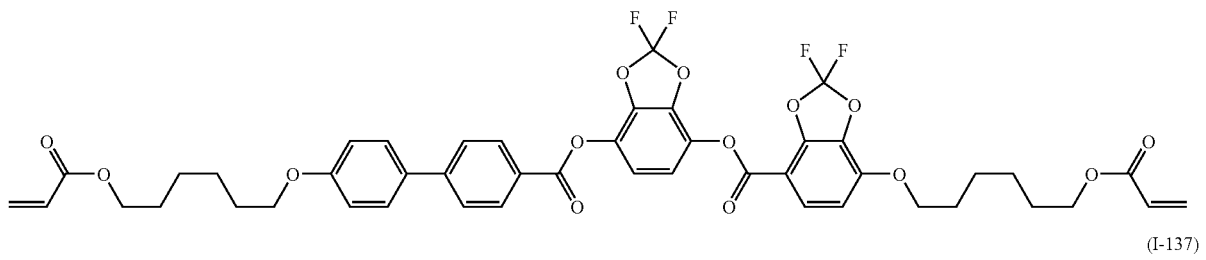
(I-137)
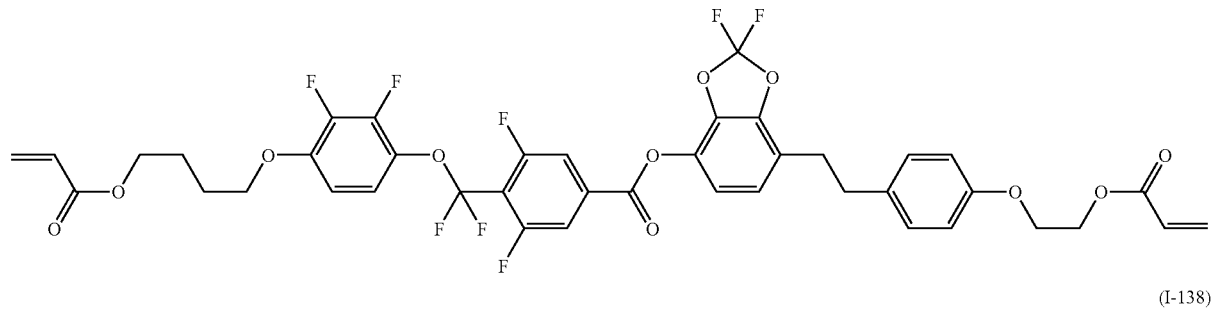
(I-138)
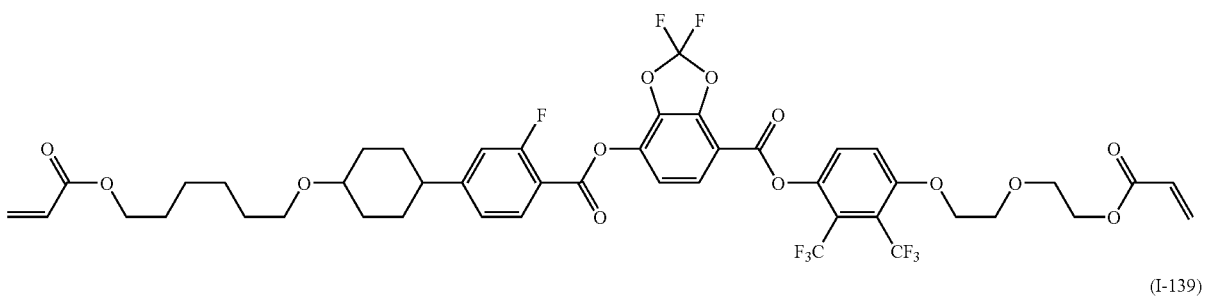
(I-139)
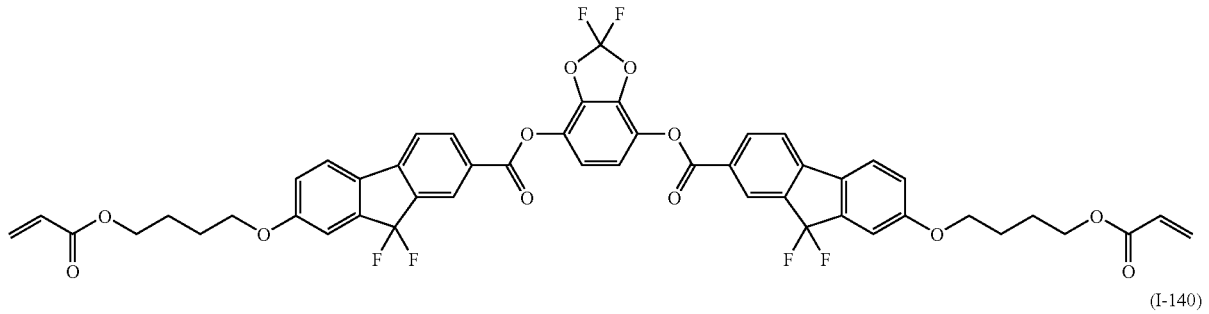
(I-140)
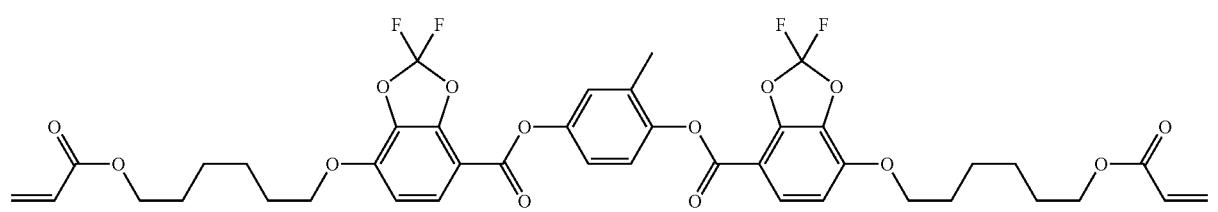

(I-141)
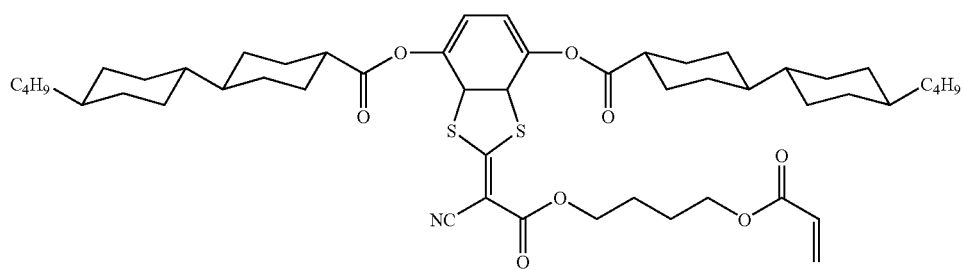
(I-142)
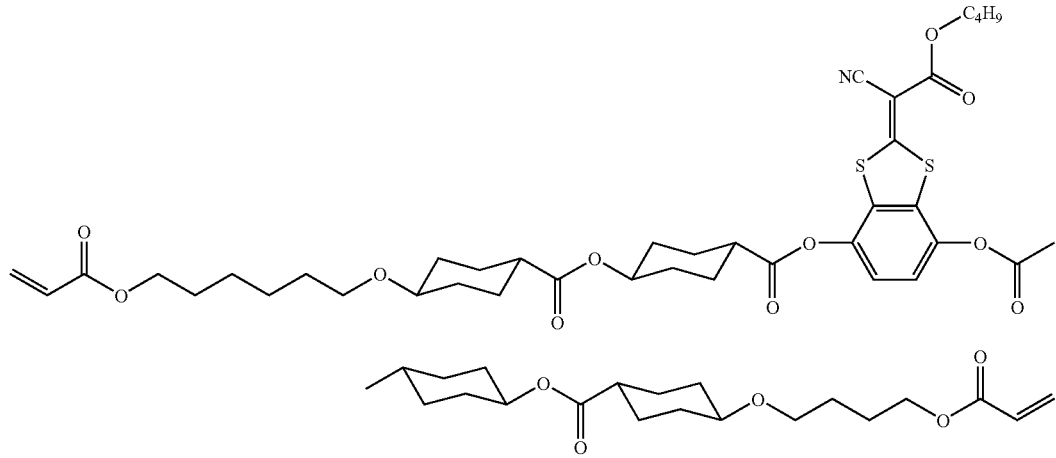
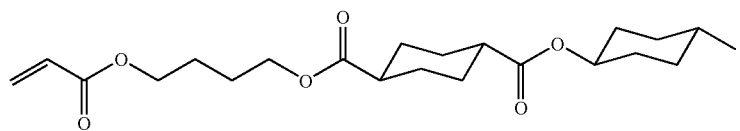
(I-143)
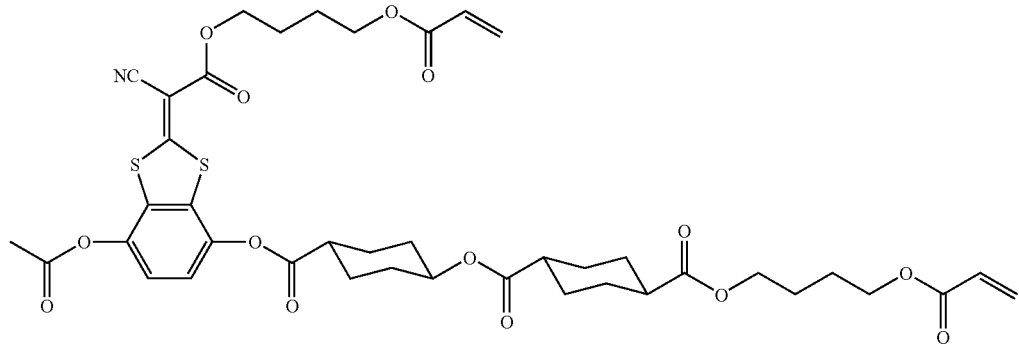
(I-144)
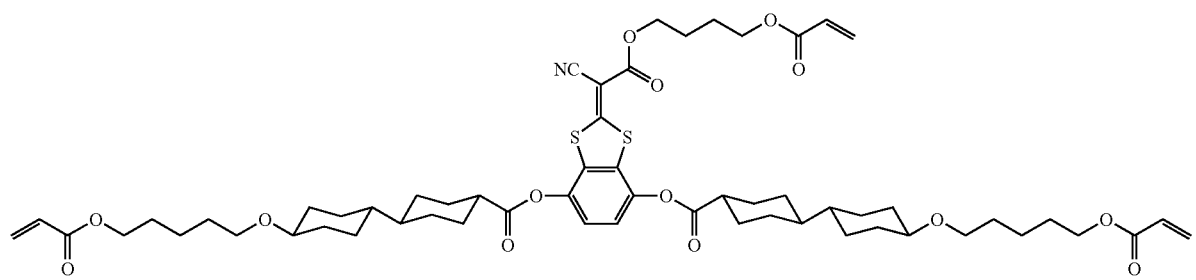

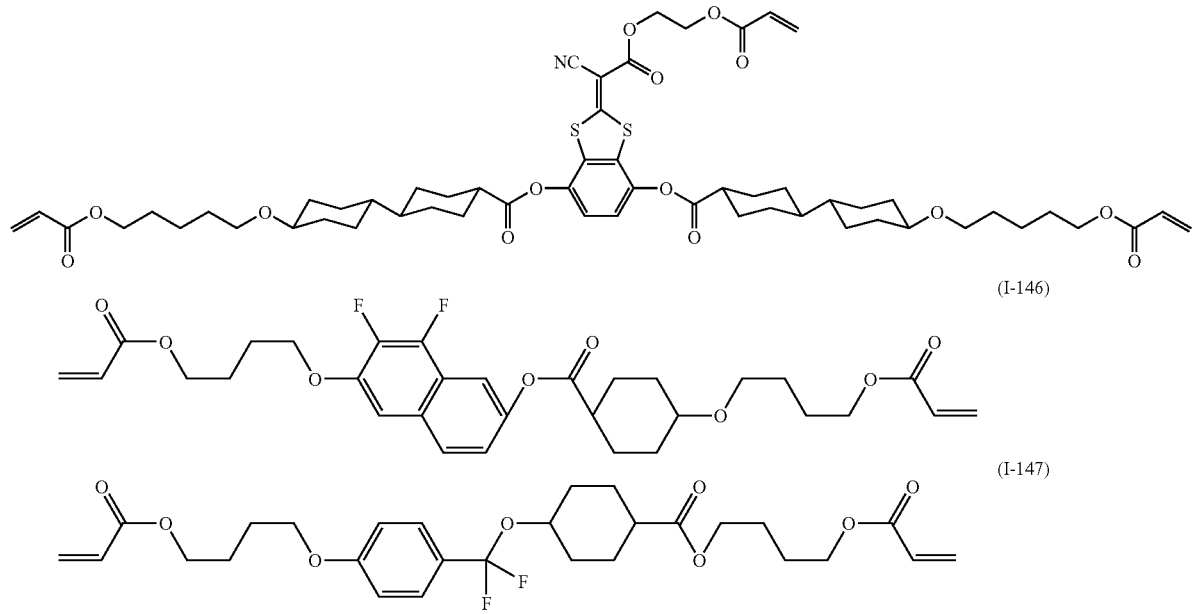

A method of producing the compound represented by the above structural formula (I-142), which is a representative compound of those represented by the General Formula (I), will be later described in the Example 1 in detail and specifically. A person skilled in the art would be able to produce any of the compounds included in the General Formula (I) with reference to the detailed description in the Examples and by properly selecting raw materials, reaction conditions and reagents, and if needed, with any modification or alteration to the methods.

The compounds included in the General Formula (I) can also be synthesized in accordance with the methods as described in JP-A Nos. 2004-231638 and 2003-238491.

The thickness of the vertical alignment film is not particularly limited and may be appropriately selected depending on the purpose. The thickness is preferably 10 nm to 2,000 nm, more preferably 20 nm to 1,000 nm, even more preferably 40 nm to 800 nm.

Since the vertical alignment film is formed with a polymerizable liquid crystal compound having negative dielectric constant anisotropy, the wettability of the liquid crystal put in is excellent, making it possible to sufficiently align vertically the liquid crystal compounds.

—Substrate—

The material for the substrate is not particularly limited as long as the vertical alignment film can be formed on the substrate, and may be an organic material or an inorganic material. Examples of the organic material include polyethylene terephthalate, polycarbonate, and triacetyl cellulose. Examples of the inorganic material include glass and silicon. In addition, on the substrate, an electrode layer such as ITO, Cr, and Al or a color filter layer may be deposited.

(Composition for the Vertical Alignment Film)

When depositing an alignment film on the substrate using polymerizable liquid crystal compounds having negative dielectric constant anisotropy, it is preferable to prepare and use a composition for the vertical alignment film, the composition containing the polymerizable liquid crystal compounds.

The composition for the vertical alignment film contains at least a polymerizable liquid crystal compound having negative dielectric constant anisotropy, and if needed, other components.

As for the polymerizable liquid crystal compound having negative dielectric constant anisotropy, the description thereon is omitted because it has already been explained.

The amount of the polymerizable liquid compound having negative dielectric constant anisotropy in the composition for the vertical alignment film is not particularly limited and may be selected appropriately depending on the purpose. The amount is preferably 5% by mass to 98% by mass, more preferably 10% by mass to 96% by mass, even more preferably 20% by mass to 95% by mass, with respect to the composition for the vertical alignment film. If the amount is less than 5% by mass, the wettability of the liquid crystal put in is lowered. If the amount is over 98% by mass, the vertical alignment of the liquid crystal compounds tends to be insufficient.

<Other Components>

Other components mentioned above are not particularly limited and may be properly selected depending on the purpose. Example thereof include onium salts, air-interface vertically alignment agents, polymerization initiators, plasticizers, surfactants, polymerizable monomers, fluorine-based polymer, and fluorine-containing compounds.

Other components may be added aiming at fixation of alignment, evenness of applied film, strengthening of film, or improvement of vertical alignment of liquid crystal compounds.

As for the onium salts, air-interface vertically alignment agents, fluorine-based polymer, and fluorine-containing compounds, those described in JP-A No. 2006-106662 may be suitably used.

The polymerization initiator is not particularly limited and may be selected in accordance with a polymerizable group of the polymerizable liquid crystal compound having negative dielectric anisotropy. Examples thereof include radical polymerization initiator and cationic polymerization initiator. The radical polymerization initiator and the cationic polymerization initiator each include heat polymerization initiator for use in heat polymerization reaction or photo polymerization initiator for use in photo polymerization reaction.

The heat polymerization initiator for the radical polymerization is, for example, azobisisobutyronitrile, and the like.

Examples of the photo polymerization initiator for the radical polymerization include α-carbonyl compounds (U.S. Pat. Nos. 2,367,661, and 2,367,670), acyloin ethers (U.S. Pat. No. 2,448,828), α-hydrocarbon-substituted aromatic acyloin compounds (U.S. Pat. No. 2,722,512), multinuclear quinone compounds (U.S. Pat. Nos. 3,046,127 and 2,951,758), combinations of triarylimidazole dimer and p-aminophenylketone (U.S. Pat. No. 3,549,367), acridine and phenazine compounds (JP-A-No. 60-105667 and U.S. Pat. No. 4,239,850), and oxadiazole compounds (U.S. Pat. No. 4,212,970).

Examples of the heat polymerization initiator used in the cationic polymerization include benzyl sulfonium salt compounds.

Examples of the photo polymerization initiator used in the cationic polymerization include organic sulfonium salt-based, iodonium salt-based, phosphonium salt-based compounds. The counter ions to these compounds are, for example, $SbF_6^-$, $PF_6^-$, and $BF_6^-$.

(Method for Producing the Vertical Alignment Film)

The method for producing the vertical alignment film of the present invention includes a step of applying the composition for vertical alignment film onto the surface of the substrate, and a step of drying the composition for vertical alignment film (coating liquid) which has been applied, and other steps, if needed.

—Applying Step—

The method for applying the composition for vertical alignment film onto the surface of the substrate is not particularly limited and may be appropriately selected depending on the purpose. Examples thereof include spin coating, die coating, gravure coating, flexographic printing, and inkjet printing.

When applying the composition for vertical alignment film onto the surface of the substrate in the applying step, it is preferable to dissolve composition for vertical alignment film in a solvent and to use it as a coating liquid.

The solvent is not particularly limited as long as it can dissolve the composition for vertical alignment film. It is preferable for the solvent to have relatively low vapor pressure at room temperature and a high boiling point in terms of coating easiness. Examples of the solvent include 1,1,2-trichloroethane, N-methylpyrrolidone, butoxy ethanol, γ-butyrolactone, ethylene glycol, polyethylene glycol monomethylether, propylene glycol, 2-pyrrolidone, N,N-dimethylformamide, phenoxyethanol, tetrahydrofuran, dimethylsulfoxide, methylisobutylketone, and cyclohexanone. The solvent may be used solely or in combination of two or more.

—Drying Step—

In the drying step, the applied composition for vertical alignment film (coating liquid) is dried to volatilize the solvent in the coating liquid.

The method for drying the composition for vertical alignment film (coating liquid) is not particularly limited and may be properly selected depending on the purpose. Examples thereof include heating and air blasting. The heating temperature to be adopted in the heating step is not particularly limited, but is preferably 80° C. to 150° C. so as not to cause polymerization in the drying step. The amount of air used in the air blasting is not particularly limited and may be appropriately selected depending on the purpose.

—Other Steps—

Examples of the "other steps" as mentioned earlier include a heating step for heating the composition for vertical alignment film after the drying step; photo irradiation step for irradiating the applied film of the composition for vertical alignment film with ultra violet ray or the like after the drying step.

The "other steps" may be performed with the heating step alone, the photo irradiation step alone, or both heating and photo irradiation steps. If both heating and photo irradiation steps are performed, either step may precede.

—Heating Step—

In the heating step, heating the composition for vertical alignment film promotes the polymerization of the compound represented by the General Formula (I).

The heating temperature in the heating step is not particularly limited so long as the heating can help polymerize the compounds represented by the General Formula (I), and may be appropriately selected depending on the purpose. In general, the temperature is preferably 150° C. to 280° C., more preferably 160° C. to 260° C., even more preferably 160° C. to 250° C.

By promoting the polymerization of the compounds represented by the General Formula (I) in the heating step, the applied film (vertical alignment film) of the composition for vertical alignment film can be fixed in a state capable of vertically aligning the liquid crystal compounds.

—Photo Irradiation Step—

In the photo irradiation step, irradiating the composition for vertical alignment film with the light such as ultraviolet ray promotes the polymerization of the compound represented by the General Formula (I).

By promoting the polymerization of the compounds represented by the General Formula (I) in the photo irradiation step, the applied film (vertical alignment film) of the composition for vertical alignment film can be fixed in a state capable of vertically aligning the liquid crystal compounds.

(Liquid Crystal Cell)

The liquid crystal cell of the present invention includes a pair of the substrates, the vertical alignment film deposited on the surface of the substrate, and a liquid crystal composition deposited between a pair of the substrates.

The liquid crystal composition contains at least a liquid crystal compound.

The vertical alignment film is disposed on the surface of at least one substrate of the pair of substrates, the surface facing the other substrate.

The vertical alignment film may be disposed on one of the substrate of the pair of the substrates, or may be disposed on each of the substrates facing each other.

The liquid crystal cell is not particularly limited and may be appropriately selected depending on purpose. The liquid crystal cell is preferably a VA mode liquid crystal cell in view that it can align the liquid crystal compounds vertically.

The liquid crystal compound preferably has negative dielectric constant anisotropy in order to function as a VA mode liquid crystal cell.

(Liquid Crystal Display Apparatus)

The liquid crystal display apparatus contains the liquid crystal cell.

The liquid crystal display apparatus is not particularly limited and may be appropriately selected depending on the purpose. The apparatus is preferably a VA mode liquid crystal display apparatus because it can vertically align the liquid crystal compounds with the vertical alignment film of the present invention.

EXAMPLES

Hereinafter, the present invention will be described with reference to the Examples, which do not limit the present invention by any means.

Example 1

Synthesis of Polymerizable Compound Having Negative Dielectric Constant Anisotropy As a polymerizable compound having negative dielectric constant anisotropy, the compound represented by the Structural Formula (I-142) was synthesized in accordance with the following pathway.

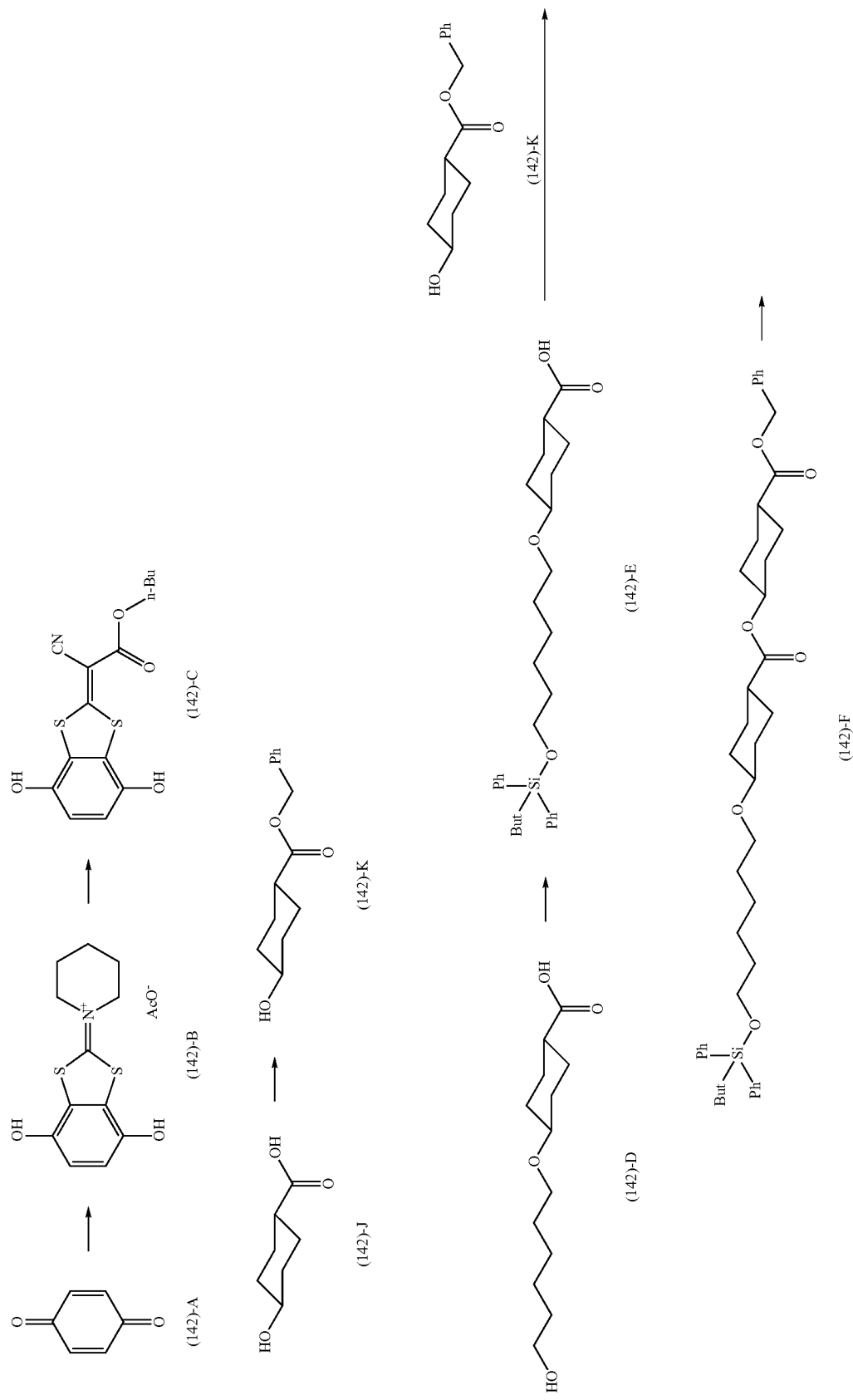

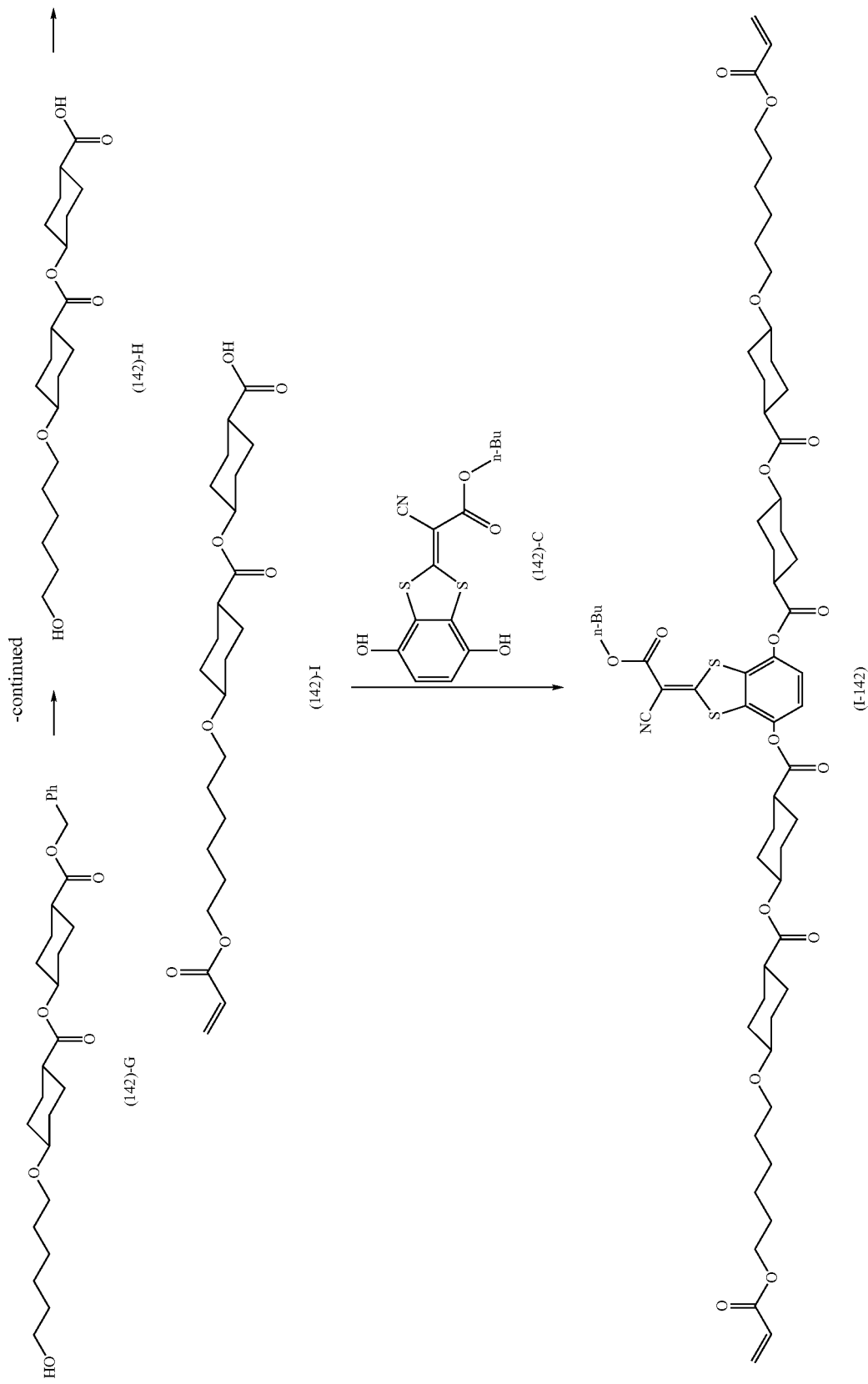

Synthesis of Compound (142)-B

Using benzoquinone (Compound (142)-A) as a starting material, Compound (142)-B was prepared according to the method described in J. Org. Chem., Vol. 69, pp. 2164 to 2177 (2004).

Synthesis of Compound (142)-C

Compound (142)-B (16.4 g) (50 mmol), and cyanobutylacetate (8.5 g) (60 mmol) were added into N-methyl-pyrrolidinone (50 mL), and the mixture was stirred for 2 hours at 90° C. After cooled to room temperature, methanol (300 mL) was added to the mixture, and the resultant precipitate was filtered out, to thereby yield the target compound (142)-C (15.2 g). The $^1$H-NMR spectrum of the obtained compound was as follows.

$^1$H-NMR (300 MHz, d$^6$-DMSO): 0.93 ppm (3H,t), 1.40 ppm (2H, m), 1.65 ppm (2H, m), 4.23 ppm (2H, t), 6.79 ppm (2H, s), 10.32 ppm (1H, s), 10.37 ppm (1H, s).

From the $^1$H-NMR spectrum and other spectrum, it was confirmed that the obtained compound was the target compound.

Synthesis of Compound (142)-K trans-4-Hydroxy-cyclohexanecarboxylic acid (compound (142)-J) (7.2 g) (50 mmol) and benzyl bromide (10.2 g) (60 mmol) were added to N-methyl-pyrrolidinone (90 mL) with stirring, and sodium bicarbonate (8.2 g) (100 mmol) was added to the mixture, followed by stirring for 3 hours at 90° C. After cooled to room temperature, ethyl acetate (400 mL) and water (300 mL) were added to the mixture, and the mixture was extracted. The organic layer was washed with a dilute hydrochloric acid and water, followed by drying with sodium sulfate and concentrating. The concentrated product was purified through silica gel chromatography, whereby the compound (142)-K (9.2 g) was yielded. From the $^1$H-NMR spectrum, it was confirmed that the yielded compound was the target compound.

Synthesis of Compound (142)-D

Compound (142)-D was synthesized according to the method described in Recl. Trav. Pays-Bas, vol.115, pp.321 to 328 (1996).

Synthesis of Compound (142)-E

Compound (142)-D (24.4 g) (0.1 mol) was added to N-methyl-pyrrolidinone (200 mL), and the mixture was stirred. At room temperature, tert-butyldiphenylchlorosilane (54.8 g) (0.22 mol) and further imidazole (27.2 g) were added to the resultant mixture. After stirring for 3 hours at room temperature, ethyl acetate (500 mL) and a dilute hydrochloric acid (500 mL) were added to the mixture, followed by extraction. The organic layer was washed with water, dried by sodium sulfate, and concentrated. The concentrated product was dissolved into methanol (300 mL) and tetrahydrofuran (200 mL), and to this solution, a solution of potassium carbonate (28 g) in water (200 mL) was poured, followed by stirring for 8 hours at room temperature. The resultant solution was concentrated, and ethyl acetate (500 mL) and water (300 mL) were added to the concentrated product, followed by extraction. The organic layer was washed with water, dried with sodium sulfate, and concentrated. The concentrated product was purified through silica gel column chromatography, to thereby yield compound (142)-E (28.5 g) (61 mmol). From the $^1$H-NMR spectrum, it was confirmed that the yielded product was the target compound.

Synthesis of Compound (142)-F

Compound (142)-E (9.5 g) (20.4 mmol) was dissolved in toluene (30 mL), and N,N-dimethylformamide (0.1 mL) and thionyl chloride (2 mL) were added to the solution, followed by stirring for 3 hours at 70° C. The solvent was removed under reduced pressure, and N-methyl-pyrrolidinone (30 mL) was added to the residue, and the mixture was stirred. Then Compound (142)-K (4.7 g) (20 mol) was added to the mixture, and the resultant mixture was cooled to 5° C. or lower. To the cooled mixture, triethylamine (3 mL) and 4-N, N-dimethylaminopyridine (100 mg) were successively added, followed by stirring for 30 minutes at 5° C. or lower and further stirring for 2 hours at room temperature. To the reaction mixture, acetic acid (200 mL) and dilute hydrochloric acid (200 mL) were added, followed by extraction. The organic layer was washed with water, and dried with sodium sulfate, and concentrated. The concentrated product was purified through silica gel chromatography, to thereby obtain Compound (142)-F (10.0 g) (14.3 mmol). From the $^1$H-NMR spectrum, it was confirmed that the obtained compound was the target compound.

Synthesis of Compound (142)-G

Compound (142)-F (20 g) (28.6 mmol) was dissolved in tetrahydrofuran (100 mL), and to this solution, acetic acid (5 mL) was added, and then tetrabutylammonium fluoride (tetrahydrofuran solution, concentration 1 mol/L) (30 mL) was added, followed by stirring for 3 hours at room temperature. To the resultant solution, acetic acid (200 mL) and dilute hydrochloric acid (200 mL) were added and the solution was extracted. The organic layer was washed with water, and dried with sodium sulfate, and concentrated. The obtained concentrates was purified through silica gel chromatography, to thereby obtain compound (142)-G (13.0 g) (28.2 mmol). $^1$H-NMR spectrum of the obtained compound was as follows.

$^1$H-NMR (300 MHz, CDCl$_3$): 1.16-2.12 ppm (24H,m), 2.21 ppm (1H, m), 2.34 ppm (1H, m), 3.47 ppm (2H, t), 3.65 ppm (2H, s), 4.70 ppm (1H, m), 5.11 ppm (2H, s), 7.37 ppm (5H, m).

It was confirmed from the $^1$H-NMR spectrum that the obtained compound was the target compound.

Synthesis of Compound (142)-H

In ethanol (130 mL), Compound (142)-G (13 g) (28.2 mmol) wasp dissolved, and 10% palladium on carbon (1.3 g) was added, followed by hydrogenation at atmospheric pressure. The catalyst was filtered with celite, and the filtrate was concentrated, to thereby obtain compound (142)-H (9.3 g) (25 mmol). From the $^1$H-NMR spectrum, it was confirmed that the obtained compound was the target compound.

Synthesis of Compound (142)-I

Compound (142)-H (7.2 g) (19 mmol) was added to N-methyl-pyrrolidinone (40 mL) with stirring, and to the mixture, acryloylchloride (5 mL) was added at 5° C. or lower. The resultant mixture was stirred for 3 hours at room temperature, and again cooled to 5° C. or lower, and a mixed solution of pyridine (6 mL) and water (6 mL) was dropped thereto. To the reaction mixture, ethyl acetate (200 mL) and a dilute hydrochloric acid (200 mL) were added, followed by extraction. The organic layer was washed with water, then dried with sodium sulfate, and concentrated, whereby the target compound, compound (142)-I (7.3 g) (17 L) was obtained. From the $^1$H-NMR spectrum, it was confirmed that the obtained compound was the target compound.

Synthesis of Compound (I-142)

In toluene (20 mL), compound (142)-I (4.5 g) (10.6 mmol) was dissolved and N,N-dimethylformamide (0.1 mL) and thionyl chloride (1.1 mL) were added thereto, followed by stirring for 3 hours at 70° C. The solvent was removed under reduced pressure, and N-methyl-pyrrolidinone (20 mL) was added to the residue with stirring. Compound (142)-C (1.61 g) (5 mol) was added thereto, and the mixture was cooled to 5° C. or lower. Under cooling, triethylamine (2 mL) and subsequently 4-N,N-dimethylaminopyridine (100 mg) were successively added, followed by stirring for 30 minutes at 5° C. or lower and further stirring for 2 hours at room temperature. To the reaction mixture, ethyl acetate (200 mL) and a dilute hydrochloric acid (200 mL) were added, followed by extraction. The organic layer was washed with water, dried with sodium sulfate, and concentrated. The concentrate was purified through silica gel chromatography, to thereby obtain the target compound (I-142) (2.5 g) (2.2 mmol). The $^1$H-NMR spectrum of the obtained compound was as follows.

$^1$H-NMR (300 MHz, CDCl$_3$): 0.93 ppm (3H, t), 1.20-1.86 ppm (36H, m),1.98-2.32 ppm (18H, m), 2.65 ppm (2H, m), 3.21 ppm (2H, m), 3.46 ppm (4H, m), 4.19 ppm (4H, m), 4.30 ppm (2H, t), 4.79 (2H, m), 5.65 ppm (2H, d), 6.14 ppm (2H, dd), 6.42 ppm (2H, d), 7.23 ppm (2H, d), 7.27 (2H, d).

From the $^1$H-NMR spectrum and other spectrum data, it was confirmed that the obtained compound was the target compound.

As to the phase transition temperature of the compound (I-142), it was found that it underwent a phase transition from a crystal state to a nematic phase at 147° C., and from the nematic phase to an isotropic phase at 163° C.

As polymerizable compounds having negative dielectric constant anisotropy, the compounds having structural formulas (I-141), and (I-143) to (I-145) were synthesized in the same way as in the synthesis of the compound having the structural formula (I-142), and also, the compounds having the structural formulas (I-84), (I-89), (I-95), (I-99), (I-129), (I-146) and (I-147) were synthesized according to the synthetic examples as described in JP-A Nos 2003-231638 and 2003-238491.

Example 2

Production of Vertical Alignment Film

Production of Polyimide Alignment Film:

SE-150 (produced by Nissan Chemical Industries, Ltd.; a horizontal alignment film material) was diluted with N-methyl-2-pyrrolidone to prepare a film forming composition having a solid content of 4% by mass. On a transparent conductive film composed of an ITO film deposited on one surface of a 1 mm thick glass substrate, the film forming composition was applied by a spinner, and dried for 60 minutes at 200° C., whereby a film having a dry thickness of 0.08 µm was formed.

Next, a compound having each of structural formulas (I-142) to (I-147), (I-84), (I-89), (I-95), (I-99), (I-129) and (I-141) (10 parts by mass), a vertical alignment agent having the structure shown below (1 part by mass), an air-interface vertical alignment promoter having the structure below (0.5 part by mass), a polymerization initiator (IRGACURE 189, produced by Ciba-special) (0.5 part by mass) were diluted with N-methyl-2-pyrrolidone, to thereby prepare a solution whose solid content was 5% by mass. On the SE-150 film on the glass substrate, the film forming composition was applied with a spinner, and the film was heated for 1 minute at 130° C., and then exposed to an ultraviolet ray of 400 mJ/cm$^2$ under nitrogen atmosphere to polymerize the liquid crystal compound, whereby a film was formed. The dry thickness of the film was 0.1 µm. These films were used for the evaluation of Example 3 as vertical alignment films 1 to 10.

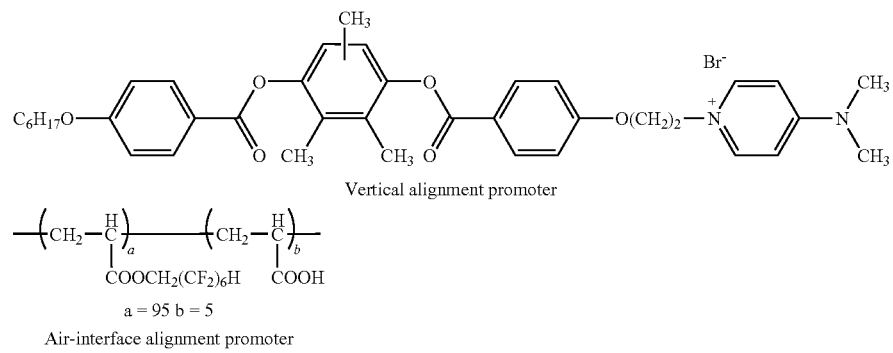

Vertical alignment promoter

Air-interface alignment promoter

Example 3

Evaluation of the Alignment Films (1) Evaluation of Wettability of the Liquid Crystals On the vertical alignment film produced in the process of Example 2, a negative-type liquid crystal (MLC-2038, produced by Merck KGaK) (8 µL) was dropped with a syringe having a needle point diameter of 0.5 mm. At 30 seconds after the drop, a contact angle formed by a vertical alignment film and a liquid crystal was measured. The contact angle was measured with a contact angle meter DROPMASTER 500 (produced by Kyowa Interface Science Co., Ltd.). Wettability was evaluated by the following evaluation standard: when a contact angle is 12 degrees of smaller, wettability is sufficient, and when a contact angle is over 12 degrees, wettability is insufficient. The results are shown in Table 1.

Next, in the same way as in Example 2, vertical alignment films 1 to 12 were deposited on a pair of a transparent electrode and a transparent electrode substrate. On the outer edge of each of transparent electrode and transparent electrode substrate, a epoxy resin adhesive agent containing aluminum oxide balls having a diameter of 5.5 µm was applied. Then, pairs of the transparent electrode/the transparent electrode substrate were laminated in such a way that the liquid crystal alignment film surfaces faced each other, and they were pressed and the adhesive agent was cured. Subsequently, a negative-type liquid crystal ((MLC-2038, produced by Merck KGaK) was put in between the substrates from a liquid crystal inlet. The liquid crystal inlet was blocked with an acryl-based photo hardening adhesive, and polarizing plates were deposited on both outside surfaces of the substrates, to thereby a liquid crystal display element was produced. The produced liquid crystal display elements were evaluated with respect to the pretilt angle referred to in item (2), and a vertical alignment referred to in item (3).

(2) Pretilt Angle

In accordance with the method described in T. J. Scheffer, et. al., J. Appl. Phys., vol. 19, p. 2013 (1980), a pretilt angle was measured through a rotating crystal method using He—Ne laser light. The results are shown in Table 1. The term "pretilt angle" here means an angle formed by an aligning direction of the liquid crystal compounds and a substrate surface.

(3) Vertical Alignment Property

The state of vertical alignment liquid crystal display element when a voltage is not applied was observed with visual inspection. When there was no light leakage, the vertical alignment was evaluated as "excellent", and when there was light leakage, it was evaluated as "no good". The results are shown in Table 1.

The above evaluations (1) to (3) were also performed for the Comparative vertical alignment films 1 and 2. The results are shown in Table 1.

—Comparative Vertical Alignment Film 1—

Comparative vertical alignment film 1 was prepared in the same manner as in preparing the vertical alignment film 1 shown in Table 1, except that a horizontal alignment film material SE-150 (produced by Nissan Chemical Industries, Ltd) was used in place of the compound represented by the structural formula (I-142).

—Comparative Vertical Alignment Film 2—

Comparative vertical alignment film 2 was prepared in the same manner as in preparing the vertical alignment film 1 shown in Table 1, except that the comparative example compound 1 shown below was used in place of the compound represented by the structural formula (I-142).

The following Comparative example compound 1 is a compound described in Example 1 of JP-A No. 2000-122066.

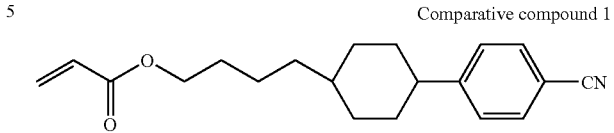

Comparative compound 1

TABLE 1

|  | Vertical alignment film | Polymerizable compound | Wettability | Pretilt angle | Vertical alignment |
| --- | --- | --- | --- | --- | --- |
| Example | Vertical alignment film 1 | (I-142) | Excellent | 88 | Excellent |
|  | Vertical alignment film 2 | (I-143) | Excellent | 89 | Excellent |
|  | Vertical alignment film 3 | (I-144) | Excellent | 89 | Excellent |
|  | Vertical alignment film 4 | (I-145) | Excellent | 88 | Excellent |
|  | Vertical alignment film 5 | (I-84) | Excellent | 89 | Excellent |
|  | Vertical alignment film 6 | (I-89) | Excellent | 90 | Excellent |
|  | Vertical alignment film 7 | (I-95) | Excellent | 90 | Excellent |
|  | Vertical alignment film 8 | (I-99) | Excellent | 89 | Excellent |
|  | Vertical alignment film 9 | (I-129) | Excellent | 90 | Excellent |
|  | Vertical alignment film 10 | (I-141) | Excellent | 89 | Excellent |
|  | Vertical alignment film 11 | (I-146) | Excellent | 88 | Excellent |
|  | Vertical alignment film 12 | (I-147) | Excellent | 89 | Excellent |
| Comp. Ex. | Comp. vert. align. film 1 | None | — | — | — |
|  | Comp. vert. align. film 2 | Comparative compound 1 | No good | 85 | No good |

(The mark "—" indicates that this evaluation was impossible because uniform alignment was not obtained.)

From the results shown in Table 1, it was confirmed that the vertical alignment films 1 to 12 produced in Example 2 had small contact angle against a liquid crystal, excellent wettability and spreadability to a liquid crystal, and excellent vertical alignment property.

What is claimed is:

1. A vertical alignment film comprising:
a polymerizable liquid crystal compound having negative dielectric constant anisotropy,
wherein the polymerizable liquid crystal compound having negative dielectric constant anisotropy is the compound represented by the following General Formula (I):

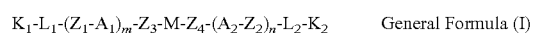

$$K_1\text{-}L_1\text{-}(Z_1\text{-}A_1)_m\text{-}Z_3\text{-}M\text{-}Z_4\text{-}(A_2\text{-}Z_2)_n\text{-}L_2\text{-}K_2 \qquad \text{General Formula (I)}$$

wherein $K_1$ represents a polymerizable group, $L_1$ and $L_2$ are the same or different, and each represent a divalent spacer group, $Z_1$, $Z_2$, $Z_3$ and $Z_4$ are the same or different, and each represent a divalent connecting group, $A_1$ and $A_2$ are the same or different, and each represent a divalent cyclic group, m and n are the same or different, and each represent an integer of 0 to 3, M represents any of the groups represented by the following General Formulas (2) to (7), and $K_2$ is any one of a hydrogen atom, an alkyl group, a substituent group, and a polymerizable group,

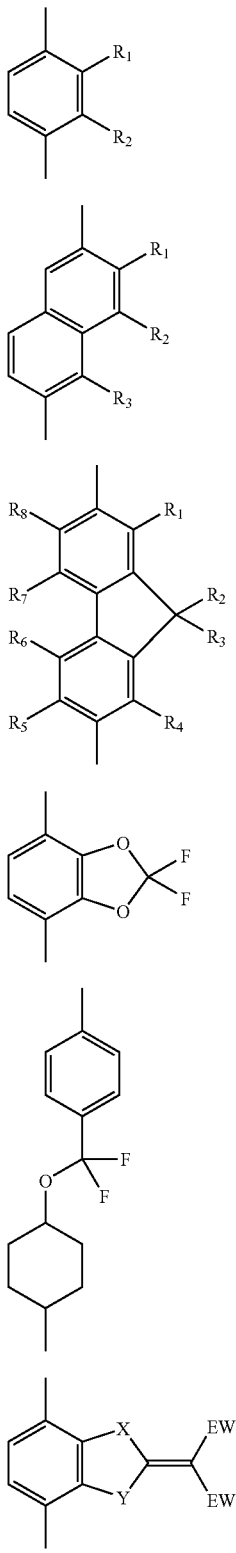

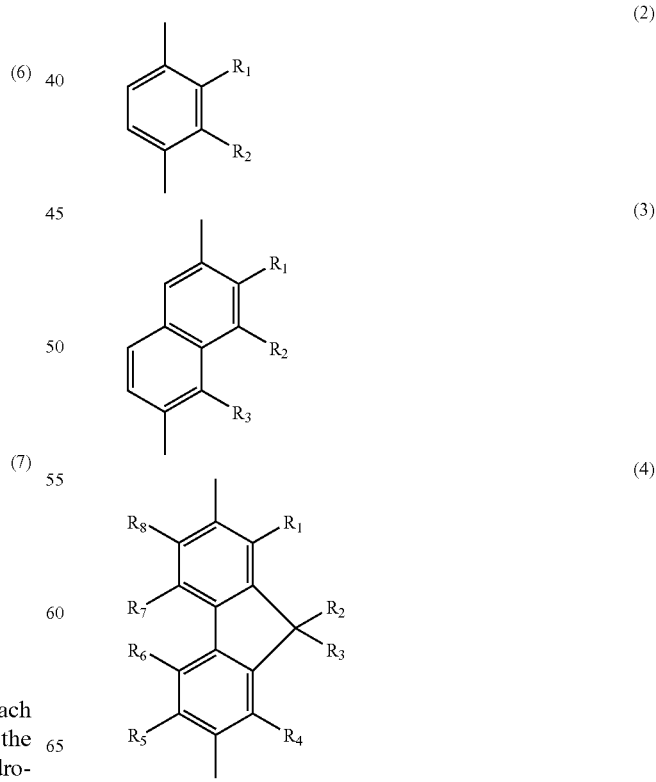

wherein in the General Formulas (2) to (7), $R_1$ to $R_8$ each represent a hydrogen atom, a fluorine atom, $CF_3$ or CN; in the General Formula (2), at least one of $R_1$ and $R_2$ is not a hydrogen atom; in the General Formula 3 at least one of $R_1$ to $R_3$ is not a hydrogen atom; in the General Formula (4), at least one of $R_1$ to $R_8$ is not a hydrogen atom; in the General Formula (7), X and Y each represent any one of oxygen atom, sulfur atom, and $NR_{100}$, the $R_{100}$ representing a hydrogen atom or an alkyl group having 1 to 4 carbon atoms; and EWG represents an electron withdrawing group, and wherein the polymerizable liquid crystal compound is vertically aligned against the surface of a substrate, and then the polymerizable liquid crystal compound is fixed to form the vertical alignment film.

2. A VA mode liquid crystal cell having a vertical alignment film comprising:

a substrate, and a polymerizable liquid crystal compound having negative dielectric constant anisotropy, wherein the polymerizable liquid crystal compound having negative dielectric constant anisotropy is the compound represented by the following General Formula (I):

$$K_1\text{-}L_1\text{-}(Z_1\text{-}A_1)_m\text{-}Z_3\text{-}M\text{-}Z_4\text{-}(A_2\text{-}Z_2)_n\text{-}L_2\text{-}K_2 \quad \text{General Formula (I)}$$

wherein $K_1$ represents a polymerizable group, $L_1$ and $L_2$ are the same or different, and each represent a divalent spacer group, $Z_1$, $Z_2$, $Z_3$ and $Z_4$ are the same or different, and each represent a divalent connecting group, $A_1$ and $A_2$ are the same or different, and each represent a divalent cyclic group, m and n are the same or different, and each represent an integer of 0 to 3, M represents any of the groups represented by the following General Formulas (2) to (7), and $K_2$ is an one of a hydrogen atom, an alkyl group, a substituent group, and a polymerizable group, -continued (5) 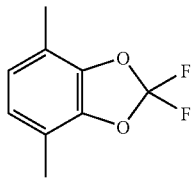

(6) 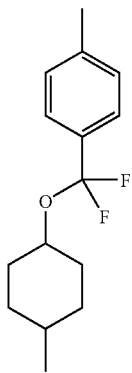

-continued (7) 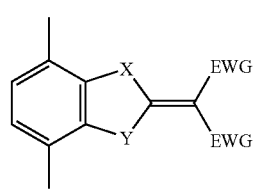

wherein in the General Formulas (2) to (7), $R_1$ to $R_8$ each represent a hydrogen atom, a fluorine atom, $CF_3$ or CN; in the General Formula (2), at least one of $R_1$ and $R_2$ is not a hydrogen atom; in the General Formula (3), at least one of $R_1$ to $R_3$ is not a hydrogen atom; in the General Formula (4), at least one of $R_1$ to $R_8$ is not a hydrogen atom; in the General Formula (7), X and Y each represent any one of oxygen atom, sulfur atom, and $NR_{100}$, the $R_{100}$ representing a hydrogen atom or an alkyl group having 1 to 4 carbon atoms; and EWG represents an electron withdrawing group, and wherein the polymerizable liquid crystal compound is vertically aligned against the surface of the substrate, and then the polymerizable liquid crystal compound is fixed to form the vertical alignment film.

\* \* \* \* \*